United States Patent
Eichelberger et al.

(10) Patent No.: US 7,178,565 B2
(45) Date of Patent: Feb. 20, 2007

(54) SELF-CONTAINED MOBILE FUELING STATION

(75) Inventors: Donald Paul Eichelberger, Macungie, PA (US); David John Farese, Riegelsville, PA (US); Joseph Perry Cohen, Bethlehem, PA (US); Richard Layton Colwell, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/925,291

(22) Filed: Aug. 24, 2004

(65) Prior Publication Data

US 2005/0103400 A1    May 19, 2005

Related U.S. Application Data

(62) Division of application No. 10/371,602, filed on Feb. 21, 2003, now Pat. No. 6,786,245.

(51) Int. Cl.
  *B65B 31/00* (2006.01)
(52) U.S. Cl. ................. 141/47; 141/4; 141/39
(58) Field of Classification Search ............ 141/1, 141/2, 4, 5, 11, 21, 39, 47, 94–96, 83, 231; 137/552, 554
See application file for complete search history.

(56) References Cited

U.S. PATENT DOCUMENTS

| | | | | |
|---|---|---|---|---|
| 3,257,031 | A | | 6/1966 | Dietz .......................... 222/23 |
| 5,409,046 | A | * | 4/1995 | Swenson et al. ............... 141/11 |
| 5,596,501 | A | | 1/1997 | Comer et al. .......... 364/464.23 |
| 5,673,735 | A | * | 10/1997 | Crvelin et al. .............. 141/197 |
| 5,682,750 | A | | 11/1997 | Preston et al. ............... 62/50.2 |
| 5,810,058 | A | | 9/1998 | Kountz et al. ................ 141/83 |
| 5,887,567 | A | | 3/1999 | White et al. ................ 123/294 |
| 5,983,962 | A | | 11/1999 | Gerardot ..................... 141/231 |
| 6,302,139 | B1 | * | 10/2001 | Dietz ......................... 137/240 |
| 6,581,623 | B1 | * | 6/2003 | Carpenter et al. .......... 137/113 |
| 2002/0014277 | A1 | | 2/2002 | Togasawa et al. ............ 141/95 |
| 2002/0046773 | A1 | | 4/2002 | Bishop et al. .............. 137/259 |

FOREIGN PATENT DOCUMENTS

WO    9852677    11/1998

OTHER PUBLICATIONS

Dynetek Industries Ltd., Mobile Hydrogen Fueling Station.

* cited by examiner

*Primary Examiner*—Timothy L. Maust
(74) *Attorney, Agent, or Firm*—Keith D. Gourley; Bryan C. Hoke, Jr.

(57) ABSTRACT

A mobile self-contained self-powered station having a plurality of vessels delivers a pressurized fluid to a receiving tank (e.g., a fuel tank of a hydrogen-powered vehicle) without using mechanical compression, external electric power, or other external utilities. The station includes first and second vessels, a conduit in fluid communication with the receiving tank and each of the first and second vessels, means for transferring at least a portion of a quantity of the pressurized fluid from the first vessel to the receiving tank, means for measuring continuously a pressure differential between the increasing pressure in the receiving tank and the decreasing pressure in the first vessel, means for discontinuing the transfer from the first vessel when a predetermined limit value is reached, and means for transferring at least a portion of a quantity of the pressurized fluid from the second vessel to the receiving tank.

13 Claims, 10 Drawing Sheets

SELF-CONTAINED MOBILE FUELING STATION

This application is a divisional application and claims the benefit of priority under 35 U.S.C. 120 of U.S. application Ser. No. 10/371,602, filed Feb. 21, 2003 now U.S. Pat. No. 6,786,245.

BACKGROUND OF THE INVENTION

The present invention relates to a method and system for delivering a pressurized fluid, such as hydrogen or another compressed gas, to a receiving tank, such as a vehicle fuel tank, and in particular the invention relates to a self-powered mobile fueling station for delivering a fuel (e.g., hydrogen) at pressures of 5,000 psig or greater to fuel tanks of vehicles, such as hydrogen-powered vehicles.

Although the invention is discussed herein with regard to delivery of pressurized hydrogen gas to fuel tanks of hydrogen-powered vehicles, persons skilled in the art will recognize that the invention has other applications. For example, it may be used to deliver other pressurized fluids which may or may not be used as fuels, and the pressurized fluids may be delivered to various types of receiving tanks other than vehicle fuel tanks.

With the increasing interest in clean and efficient fuels, automobile manufacturers are designing and manufacturing hydrogen-powered vehicles that are powered by fuel cells or hydrogen internal combustion engines. Hydrogen is being tested in these vehicles and has the potential to be the fuel of choice in the future.

These hydrogen-powered vehicles are in the development stage and manufacturers are performing extensive tests to improve the vehicles and related technologies. Since there is not an established hydrogen fueling infrastructure in place, some manufacturers are installing fixed hydrogen fueling stations at test sites and elsewhere. Testing is taking place throughout North America without sufficient capability to fuel the test vehicles away from the fixed hydrogen fueling stations.

Hydrogen-powered vehicles are also being demonstrated and promoted at public events to increase consumer awareness and interest. These events are taking place at many locations where hydrogen fueling is needed but is not available. Currently, hydrogen is delivered to these events in the form of liquid or as a cylinder product.

BX cylinders, individually or in packs, are typically used to provide hydrogen to customers. However, these cylinders are very heavy and difficult (expensive) to transport.

In view of the above, there is a need for mobile hydrogen fueling stations to fuel test vehicles and demonstration vehicles at public events. Mobile hydrogen fueling stations also could be used for maintaining small fleets of hydrogen-powered vehicles, providing fuel for emergency roadside assistance, and for fueling stationary fuel cells or hydrogen-powered facilities at remote sites.

Powertech Labs and Dynatek, Inc. have offered for sale a mobile fueling station that is believed to have a supply pressure of 3,600 psig.

There exists a void in the availability of fuel for hydrogen-powered vehicles. Government and industry demonstration projects are hampered by the inability to fuel the prototype vehicles being tested and demonstrated.

In view of the current needs of industry and government programs, a mobile hydrogen fueling station is needed. Preferably, such a station should be a self-contained, self-powered, mobile fueling station capable of delivering high pressure gas (e.g., at pressures of 5,000 psig or more) in an optimal manner (e.g., minimal fueling time and maximum usage of the fuel carried by the mobile fueling station so as to minimize the need to refill the station).

As used herein, the term "self-contained" means that the power needed to actuate valves, deliver compressed gas at maximum pressure and at maximum rates, provide communications between the fueling station and a vehicle to be filled, and provide communications between the fueling station and a remote monitor is inherent in the fueling station. The term "self-powered" means that no external electric power or other external utilities are needed to operate the fueling functions of the mobile fueling station.

Although the prior art includes various types of mobile fueling stations, none of these stations satisfy the current needs. For example, U.S. Pat. Nos. 5,983,962 and 3,257,031 each disclose a mobile fueling station. However, these patents do not teach how to deliver high-pressure hydrogen in an optimal manner.

Other patents and publications also disclose mobile delivery stations for storing and dispensing fuel, but these stations are not self-powered and are not designed to deliver high-pressure hydrogen in an optimal manner. See for example, U.S. Pat. Nos. 5,887,567 and 5,682,750. See also U.S. Patent Application No. 2002/0046773 and International Publication WO 98/52677.

U.S. Pat. No. 5,596,501 discloses a system for dispensing fuel at remote locations and a method of operating same. However, it does not teach a mobile self-contained delivery station for delivering high-pressure hydrogen in an optimal manner.

The present invention teaches delivery of high-pressure hydrogen in a cascading manner to optimize fueling time. Although the prior art does disclose cascading (e.g., U.S. Pat. Nos. 5,673,735 and 5,810,058), it does not disclose cascading delivery in an optimal manner (e.g., to provide an optimal rate of fill) for use in a self-powered, self-contained mobile hydrogen fueling station.

U.S. Patent Application No. 2002/0014277 discloses an apparatus and method for filling a tank with hydrogen gas. However, it does not address the problems involved with filling tanks or storage vessels of various sizes.

It is desired to have an improved method and system for delivering a pressurized fluid, such as hydrogen gas, to a receiving tank, such as a vehicle fuel tank.

It is further desired to have a method and system to allow for the fueling of hydrogen-powered vehicles in areas where there is no hydrogen infrastructure (pipeline, plants, filling stations, etc.).

It is still further desired to have a self-contained mobile fueling station which can be deployed anywhere and provide fuel, such as hydrogen, to vehicle demonstration projects on an efficient, economical basis.

It is still further desired to have an automatic method and system to safely store and dispense hydrogen gas at different pressures, making it possible to fuel a vehicle rated for 5,000 psig or more without the use of a compressor.

It is still further desired to have a self-powered mobile hydrogen fueling station to support hydrogen demonstration projects and small hydrogen-powered vehicle fleets without the use of external electric power or other external utilities.

It is still further desired to have a self-powered mobile hydrogen fueling station which also may be used to provide emergency roadside assistance to hydrogen-powered vehicles and/or to stationary fuel cells or hydrogen-powered facilities at remote locations.

It is still further desired to have an improved method and system for controlling the rate of delivery of a pressurized fluid, such as hydrogen gas, to a receiving tank, such as a vehicle fuel tank.

It also is desired to have a method and system for delivering a pressurized fluid, such as a hydrogen fuel, at a controlled rate of delivery to receiving tanks of various sizes, such as vehicle fuel tanks, which afford better performance than the prior art, and which also overcome many of the difficulties and disadvantages of the prior art to provide better and more advantageous results.

BRIEF SUMMARY OF THE INVENTION

The present invention is a self-powered station and a method for delivering a pressurized fluid from the self-powered station to a receiving tank without using mechanical compression, external electric power, or other external utilities. The invention also includes an apparatus and method for controlling a rate of delivery of a pressurized fluid from a storage vessel to a receiving tank through a conduit in fluid communication with the storage vessel and the receiving tank.

A first embodiment of the self-powered station has a plurality of vessels, including a first vessel containing a first quantity of the pressurized fluid at a first pressure and a second vessel containing a second quantity of the pressurized fluid at a second pressure. The station also includes: a conduit having a first end in fluid communication with a first receiving tank and a second end in controllable fluid communication with each of the first vessel and the second vessel; means for transferring at least a portion of the first quantity of the pressurized fluid from the first vessel through the conduit to the first receiving tank without using mechanical compression, external electric power, or other external utilities, thereby resulting in an increasing pressure in the first receiving tank and a decreasing pressure in the first vessel, the increasing pressure in the first receiving tank being less than the second pressure of the pressurized fluid in the second vessel; means for measuring continuously a pressure differential between the increasing pressure in the first receiving tank and the decreasing pressure in the first vessel; means for discontinuing the transfer of the pressurized fluid from the first vessel when a predetermined limit value is reached; and means for transferring at least a portion of the second quantity of the pressurized fluid from the second vessel through the conduit to the first receiving tank without using mechanical compression, external electric power, or other external utilities.

There are several variations of the first embodiment of the self-powered station. In one variation, the pressurized fluid is a gas. In another variation, the pressurized fluid is hydrogen. In another variation, the limit value of the pressure differential is zero. In yet another variation, the first receiving tank is a vehicle storage tank.

A second embodiment of the self-powered station is similar to the first embodiment but includes means for moving the self-powered station from the first location near the first receiving tank to a second location near a second receiving tank.

A third embodiment of the self-powered station is similar to the first embodiment but includes an insulation material disposed between the first or second vessel and a vessel adjacent the first or second vessel.

A fourth embodiment of the self-powered station is similar to the first embodiment but includes a gas-permeable roof adapted to vent the pressurized fluid in a gaseous state.

The fifth embodiment of the self-powered station is similar to the first embodiment but includes the following additional elements: means for determining when the plurality of vessels are empty or near empty; means for monitoring the self-powered station from a monitor in a remote location; and means for reporting to the monitor from the self-powered station a determination that the plurality of vessels are empty or near empty.

A sixth embodiment is an automated mobile self-contained self-powered station having a plurality of vessels for delivering a pressurized hydrogen gas at 5,000 psig or greater to a first hydrogen-powered vehicle fuel storage tank without using mechanical compression, external electric power, or other external utilities. The station includes a first vessel containing a first quantity of the pressurized hydrogen gas at a first pressure, and a second vessel containing a second quantity of the pressurized hydrogen gas at a second pressure. The station also includes: a conduit having a first end in fluid communication with the first hydrogen-powered vehicle fuel storage tank and a second end in controllable fluid communication with each of the first vessel and the second vessel; means for transferring at least a portion of the first quantity of the pressurized hydrogen gas from the first vessel through the conduit to the first hydrogen-powered vehicle fuel storage tank without using mechanical compression, external electric power, or other external utilities, thereby resulting in an increasing pressure in the first hydrogen-powered vehicle fuel storage tank and a decreasing pressure in the first vessel, the increasing pressure in the first hydrogen-powered vehicle fuel storage tank being less than the second pressure of the pressurized hydrogen gas in the second vessel; means for measuring continuously a pressure differential between the increasing pressure in the first hydrogen-powered vehicle fuel storage tank and the decreasing pressure in the first vessel; means for discontinuing the transfer of the pressurized hydrogen gas from the first vessel when a predetermined limit value is reached; means for transferring at least a portion of the second quantity of the pressurized hydrogen gas from the second vessel through the conduit to the first hydrogen-powered vehicle fuel storage tank without using mechanical compression, external electric power, or other external utilities; means for moving the mobile self-contained self-powered station from a first location near the first hydrogen-powered vehicle fuel storage tank to a second location near a second hydrogen-powered vehicle fuel storage tank; means for determining when the plurality of vessels are empty or near empty; means for monitoring the mobile self-contained self-powered station from a monitor in a remote location; and means for reporting to the monitor from the mobile self-contained self-powered station a determination that the plurality of vessels are empty or near empty.

The present invention also includes an apparatus for controlling a rate of delivery of a pressurized fluid from a storage vessel to a receiving tank through a conduit in fluid communication with the storage vessel and the receiving tank. The apparatus includes: means for establishing a predetermined rate of pressure rise to be maintained during a predetermined time period for filling of the receiving tank with the pressurized fluid; and means for maintaining the predetermined rate of pressure rise during filling of the receiving tank with the pressurized fluid during the predetermined time period.

There are several variations of the apparatus. In one variation, the means for establishing a predetermined rate of pressure rise includes a computer/controller for generating an electrical signal convertible to a low pressure gas signal, and a regulator for amplifying the low pressure gas signal and controlling a fill pressure in the receiving tank.

In another variation, the means for maintaining the predetermined rate of pressure rise includes: a pressure control device in communication with the conduit or another conduit through which the pressurized fluid flows at an actual pressure before entering the receiving tank, the pressure control device adapted to increase or decrease the actual pressure of the pressurized fluid; means for calculating periodically a rate of pressure rise over time; and means for commanding the pressure control device to decrease the actual pressure when the rate of pressure rise is greater than the established predetermined rate of pressure rise, and to increase the actual pressure when the rate of pressure rise is less than the established predetermined rate of pressure rise.

In yet another variation of the apparatus, the rate of delivery is controlled as a function of either a percentage of a designated target pressure already achieved or a percentage of a designated target pressure yet to be achieved during a remaining portion of the predetermined time period. In a variant of this variation, the function is linear. In another variant, the function is geometric. In yet another variant, the receiving tank has an instantaneous thermodynamic state where the function varies over time with any changes in the instantaneous thermodynamic state to provide an optimal rate of fill.

Another embodiment is an apparatus for controlling a rate of delivery of a pressurized hydrogen gas at 5,000 psig or greater from at least one storage vessel to a hydrogen-powered vehicle storage tank through a conduit in fluid communication with the at least one storage vessel and the hydrogen-powered vehicle storage tank. This embodiment includes: means for establishing a predetermined rate of pressure rise to be maintained during a predetermined time period for filling of the hydrogen-powered vehicle fuel storage tank with the pressurized hydrogen gas, comprising a computer/controller for generating an electric signal convertible to a low pressure gas signal, and a regulator for amplifying the low pressure gas signal and controlling a fill pressure in the receiving tank; means for maintaining the predetermined rate of pressure rise during filling of the hydrogen-powered vehicle fuel storage tank with the pressurized hydrogen gas during the predetermined time period, comprising a pressure control device in communication with the conduit or another conduit through which the pressurized hydrogen gas flows at an actual pressure before entering the hydrogen-powered vehicle fuel storage tank, the pressure control device adapted to increase or decrease the actual pressure of the pressurized hydrogen gas, means for calculating periodically a rate of pressure rise over time, and means for commanding the pressure control device to decrease the actual pressure when the rate of pressure rise is greater than the established predetermined rate of pressure rise, and to increase the actual pressure when the rate of pressure rise is less than the established predetermined rate of pressure rise, wherein the rate of delivery is controlled as a function of either a percentage of a designated target pressure already achieved or a percentage of a designated target pressure yet to be achieved during a remaining portion of the predetermined time period.

The present invention also includes a method for delivering a pressurized fluid from a self-powered station to a first receiving tank without using mechanical compression, external electric power, or other external utilities, the self-powered station having a plurality of vessels, including at least a first vessel containing a first quantity of the pressurized fluid at a first pressure and a second vessel containing a second quantity of the pressurized fluid at a second pressure. There are several embodiments and variations of the method. The first embodiment includes multiple steps. The first step is to provide a conduit having a first end and a second end in controllable fluid communication with each of the first vessel and the second vessel. The second step is to place the first end of the conduit in fluid communication with the first receiving tank. The third step is to transfer at least a portion of the first quantity of the pressurized fluid from the first vessel through the conduit to the first receiving tank without using mechanical compression, external electric power, or other external utilities, thereby resulting in an increasing pressure in the first receiving tank and a decreasing pressure in the first vessel, the increasing pressure in the first receiving tank being less than the second pressure of the pressurized fluid in the second vessel. The fourth step is to measure continuously a pressure differential between the increasing pressure and the first receiving tank and the decreasing pressure in the first vessel. The fifth step is to designate a limit value of the pressure differential at which a transfer of the pressurized fluid from the first vessel to the first receiving tank is to be discontinued. The fifth step is to designate a limit value of the pressure differential at which a transfer of the pressurized fluid from the first vessel to the first receiving tank is to be discontinued. The sixth step is to discontinue the transfer of the pressurized fluid from the first vessel when the limit value is reached. The seventh step is to transfer at least a portion of the second quantity of the pressurized fluid from the second vessel through the conduit to the first receiving tank without using mechanical compression, external electric power, or other external utilities.

There are several variations of the first embodiment of the method. In one variation, the first receiving tank is a vehicle fuel storage tank. In another variation, the pressurized fluid is a gas. In another variation, the pressurized fluid is hydrogen. In yet another variation, the limit value of the pressure differential is zero.

A second embodiment of the method is similar to the first embodiment of the method but includes an additional step. In the second embodiment, the self-powered station is mobile or portable and the additional step is to move the self-powered station from a first location near the first receiving tank to a second location near a second receiving tank.

A third embodiment is an automated method for delivering a pressurized hydrogen gas at 5,000 psig or greater from a mobile self-contained self-powered station to a first hydrogen-powered vehicle fuel storage tank without using mechanical compression, external electric power, or other external utilities, the self-powered station having a plurality of vessels, including at least a first vessel containing a first quantity of the pressurized hydrogen gas at a first pressure and a second vessel containing a second quantity of the pressurized hydrogen gas at a second pressure. The automated method includes multiple steps. The first step is to provide a conduit having a first end and a second end in controllable fluid communication with each of the first vessel and the second vessel. The second step is to place the first end of the conduit in fluid communication with the first hydrogen-powered vehicle fuel storage tank. The third step is to transfer at least a portion of the first quantity of the pressurized hydrogen gas from the first vessel through the conduit to the first hydrogen-powered vehicle fuel storage tank without using mechanical compression, external electric power, or other external utilities, thereby resulting in an increasing pressure in the first hydrogen-powered vehicle fuel storage tank and a decreasing pressure in the first vessel, the increasing pressure in the first hydrogen-powered vehicle fuel storage tank being less than the second pressure of the pressurized hydrogen gas in the second vessel. The fourth step is to measure continuously a pressure differential between the increasing pressure in the first hydrogen-powered vehicle fuel storage tank and the decreasing pressure in the first vessel. The fifth step is to designate a limit value of the pressure differential at which a transfer of the first pressurized hydrogen gas from the first vessel to the first hydrogen-powered vehicle fuel storage tank is to be discontinued. The sixth step is to discontinue the transfer of the pressurized hydrogen gas from the first vessel when the limit value is reached. The seventh step is to transfer at least a portion of the second quantity of the pressurized hydrogen gas from the second vessel through the conduit to the first hydrogen-powered vehicle fuel storage tank without using mechanical compression, external electric power, or other external utilities. The eighth step is to move the mobile self-contained self-powered station from a first location near the first hydrogen-powered vehicle storage tank to a second location near a second hydrogen-powered vehicle fuel storage tank.

A fourth embodiment is a method for delivering a pressurized fluid from a self-powered station to at least one receiving tank without using mechanical compression, electric power, or other external utilities, the self-powered station having n+1 vessels, wherein n is an integer greater than zero, each vessel containing a quantity of the pressurized fluid having a pressure which decreases as the quantity decreases. This fourth embodiment of the method includes the following steps: (a) providing a conduit having a first end and a second end in controllable fluid communication with each of the vessels; (b) selecting the receiving tank to receive the pressurized fluid; (c) engaging the first end of the conduit in fluid communication with the selected receiving tank, the selected receiving tank having a pressure which increases as the quantity of pressurized fluid is delivered to the selected receiving tank; (d) selecting a vessel presently containing a quantity of pressurized fluid at a pressure greater than a present pressure of the pressurized fluid in the selected receiving tank; (e) transferring at least a portion of the quantity of the pressurized fluid from the selected vessel through the conduit to the selected receiving tank without using mechanical compression, electric power, or other external utilities, thereby resulting in an increasing pressure in the selected receiving tank and a decreasing pressure in the selected vessel from which the pressurized fluid is being transferred, the increasing pressure in the selected receiving tank being less than the pressure of the pressurized fluid in at least one other vessel; (f) measuring continuously a pressure differential between the increasing pressure in the selected receiving tank and the decreasing pressure in the selected vessel from which pressurized fluid is being transferred; (g) designating a limit value of the pressure differential at which a transfer of the pressurized fluid from the selected vessel is to be discontinued; (h) discontinuing the transfer of the pressurized fluid from the selected vessel when the limit value is reached; (i) selecting another vessel presently containing a quantity of the pressurized fluid at a pressure greater than the present pressure of the pressurized fluid in the selected receiving tank; (j) transferring at least a portion of another quantity of the pressurized fluid from the another selected vessel through the conduit to the selected receiving tank without using mechanical compression, electrical power, or other external utilities; (k) repeating steps (d) through (j) until the selected receiving tank is filled with pressurized fluid at a desired filled pressure; and disengaging the first end of the conduit from fluid communication with the selected receiving tank.

A fifth embodiment of the method is similar to the fourth embodiment of the method, but includes the following additional steps: (m) selecting another receiving tank to receive the pressurized fluid; (n) repeating steps (c) through (n) until the pressurized fluid can no longer be delivered from the self-powered station to the last selected receiving tank without using mechanical compression, electric power, or other external utilities.

A sixth embodiment of the method is similar to the fifth embodiment but includes the additional steps of: (o) refilling at least two of the n+1 vessels with the pressurized fluid, each refilled vessel containing a quantity of the pressurized fluid having a pressure which decreases as the quantity decreases; and (p) repeating steps (b) through (p).

The present invention also includes a method for controlling a rate of delivery of a pressurized fluid from a storage vessel to a receiving tank through a conduit in fluid communication with the storage vessel and the receiving tank. The method includes two steps. The first step is to establish a predetermined rate of pressure rise to be maintained during a predetermined time period for filling of the receiving rank with the pressurized fluid. The second step is to maintain the predetermined rate of pressure rise during filling of the receiving tank with the pressurized fluid during the predetermined time period.

There are several variations of the method for controlling the rate of delivery of the pressurized fluid. In one variant, the step of establishing a predetermined rate of pressure rise includes multiple sub-steps. The first sub-step is to generate an electric signal convertible to a low pressure gas signal. The second sub-step is to amplify the low pressure gas signal. The third sub-step is to control a fill pressure in the receiving tank.

In another variation, the step of maintaining the predetermined rate of pressure rise includes multiple sub-steps. The first sub-step is to provide a pressure control device in communication with the conduit or another conduit through which the pressurized fluid flows at an actual pressure before entering the receiving tank, the pressure control device adapted to increase or decrease the actual pressure of the pressurized fluid. The second sub-step is to calculate periodically a rate of pressure rise over time. The third sub-step is to command the pressure control device to decease the actual pressure when the rate of pressure rise is greater than the established predetermined rate of pressure rise, and to increase the actual pressure when the rate of pressure rise is less than the established predetermined rate of pressure rise.

In another variation of the method, the rate of delivery is controlled as a function of either a percentage of a designated target pressure already achieved, or a percentage of a designated target pressure yet to be achieved during a remaining portion of the predetermined time period. In a variant of this variation, the function is linear. In another variant, the function is geometric. In yet another variant, the receiving tank has an instantaneous thermodynamic state and the function varies over time with any changes in the instantaneous thermodynamic state to provide an optimal rate of fill.

Another embodiment is a method for controlling a rate of delivery of a pressurized hydrogen gas at 5,000 psig or greater from at least one storage vessel to a hydrogen-powered vehicle fuel storage tank through a conduit in fluid communication with the at least one storage vessel and the hydrogen-powered vehicle fuel storage tank. This embodiment includes multiple steps. The first step is to establish a predetermined rate of pressure rise to be maintained during a predetermined time period for filling of the hydrogen-powered vehicle fuel storage tank with the pressurized hydrogen gas. This first step includes several sub-steps. The first sub-step is to generate an electric signal convertible to a low pressure gas signal. The second sub-step is to amplify the low pressure gas signal. The third sub-step is to control a fill pressure in the hydrogen-powered vehicle fuel storage tank. The second step of the method is to maintain the predetermined rate of pressure rise during filling of the hydrogen-powered vehicle fuel storage tank with the pressurized hydrogen gas during the predetermined time period. This second step includes several sub-steps. The first sub-step is to provide a pressure control device in communication with the conduit or another conduit-through which the pressurized hydrogen gas flows at an actual pressure before entering the hydrogen-powered vehicle fuel storage tank, the pressure control device adapted to increase or decrease the actual pressure of the pressurized hydrogen gas. The second sub-step is to calculate periodically a rate of pressure rise over time. The third sub-step is to command the pressure control device to decrease the actual pressure when the rate of pressure rise is greater than the established predetermined rate of pressure rise, and to increase the actual pressure when the rate of pressure rise is less than the predetermined rate of pressure rise. In this embodiment, the rate of delivery is controlled as a function of either a percentage of a designated target pressure already achieved or a percentage of a designated target pressure yet to be achieved during a remaining portion of the predetermined time period.

BRIEF DESCRIPTION OF THE DRAWINGS

The invention will be described by way of example with reference to the accompanying drawings, in which.

DETAILED DESCRIPTION OF THE INVENTION

The present invention is a self-contained self-powered mobile fueling station that satisfies a growing need in building a hydrogen infrastructure. The fueling station leverages the benefits of cascade filling to optimize the use of available pressures and volume to provide an optimal rate of filling the fuel tank of a hydrogen-powered vehicle. Since the fueling station is self-powered, its delivery of fuel to the vehicle does not need any additional compression, and therefore does not require any hook-up to external electric power or other external utilities.

Automatic filling of a vehicle tank by the fueling station is provided by use of PLC control of interlocked solenoid operated valves. The valves are actuated either by a portion of the hydrogen gas inventory or by a regulated gas from a dedicated high-pressure cylinder, which is safer than manual operation of the valves. Power required to operate the PLC is provided by a deep cycle battery, which is recharged by roof-mounted photovoltaic cells, regenerative (axle) generators, or a relatively small fuel cell powered by the system hydrogen inventory.

When the hydrogen inventory drops to a quantity where recharging the system is necessary, the unit communicates (wireless) with a monitoring facility, letting someone know that it is time to retrieve the unit for recharging. The use of composite materials in the storage vessels of the fueling station allows transport of the station to any region by light-weight vehicles (<10,000 lbs.), and it therefore does not require any special license.

The ability to provide fuel on a mobile platform permits extension of hydrogen-powered vehicle demonstration projects with little cost associated with refueling. The self-contained self-powered mobile hydrogen fueling station can be deployed anywhere. The only requirement is a flat surface to park on. No electrical wiring is required. No construction is required at the site, removing economic hurdles for development and additional demonstrations.

Figure 1:
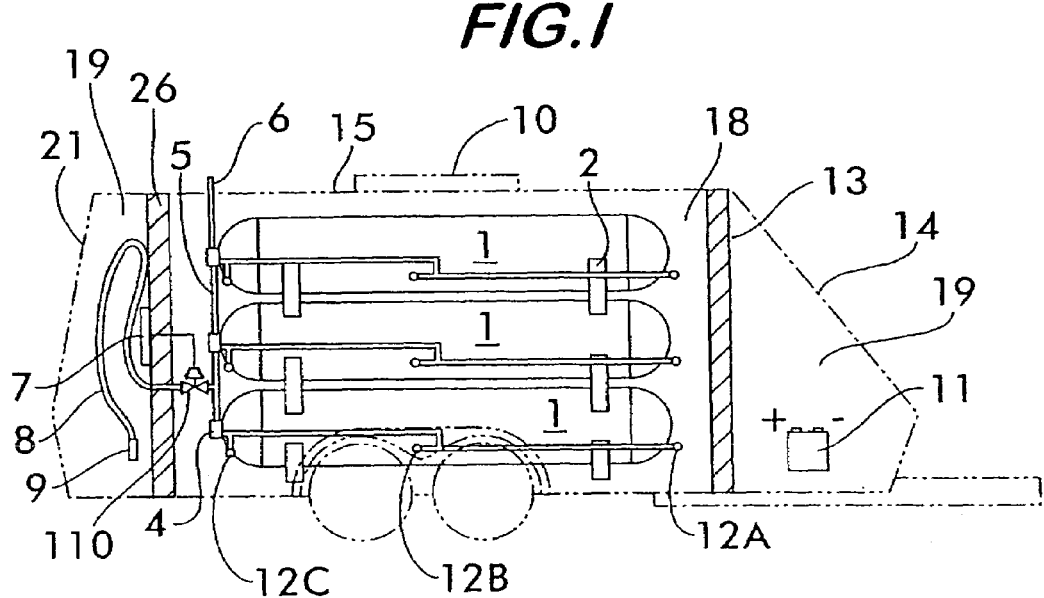
FIG. 1 is a schematic diagram illustrating an elevation view of one embodiment of the self-contained mobile fueling station of the present invention.
Figure 2:
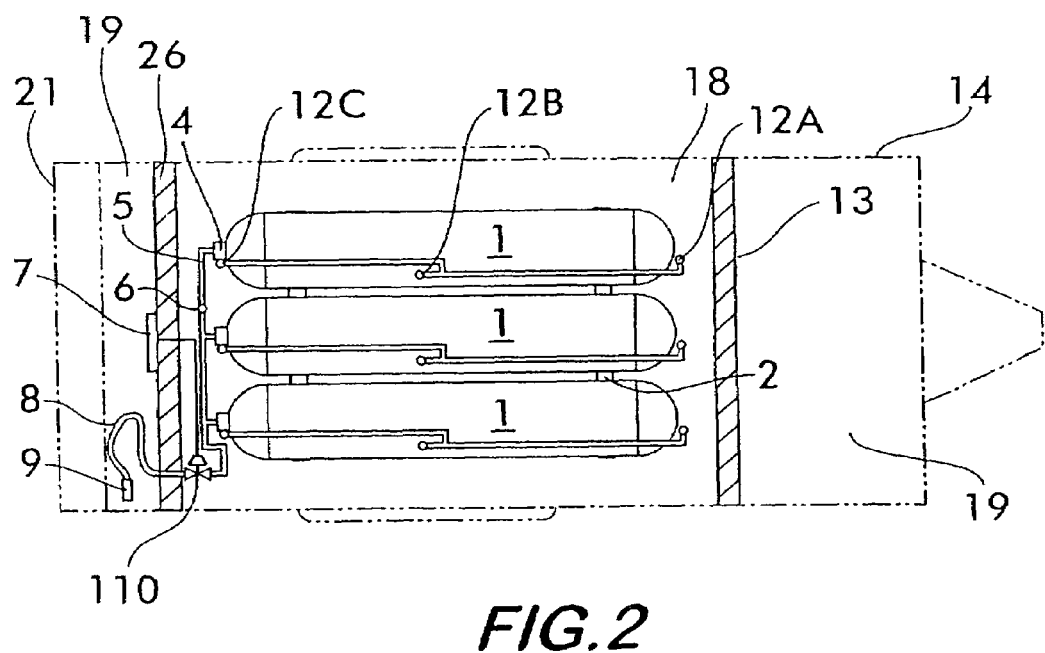
FIG. 2 is a schematic diagram illustrating a plan view of one embodiment of the self-contained mobile fueling station of the present invention.
Figure 3:
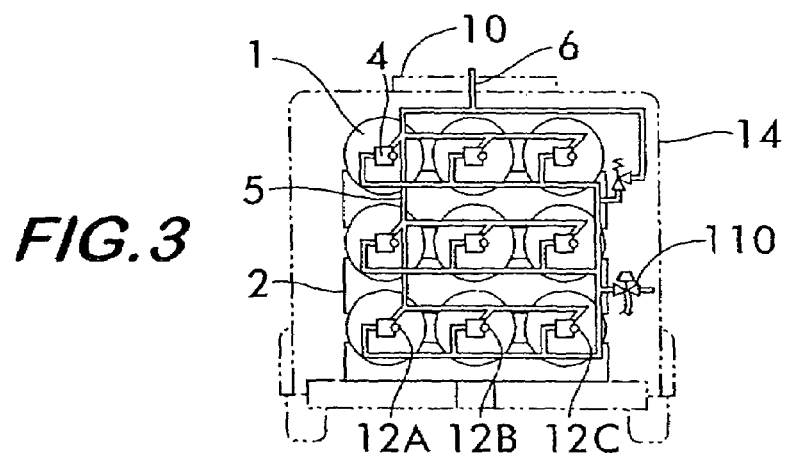
FIG. 3 is a schematic illustration of an end view of one embodiment of the self-contained mobile fueling station of the present invention.

One embodiment of the invention is illustrated in FIGS. 1–9. Referring to FIGS. 1, 2 and 3, the self-contained mobile fueling station 20 includes a mobile platform 14, an array of storage vessels 1, a composite vessel support system 2, a composite vessel overpressure protection system 3, actuating valves 4, a gas manifold 5, a flammable gas vent system 6, a dispenser panel including a PLC 7 mounted on a division wall 26, a fueling hose 8 and nozzle 9, roof-mounted photovoltaic cells 10, and a battery 11 for electric storage.

The fueling station 20 provides mobile fueling via a towable trailer (shown in phantom lines) having a gross vehicle curb weight less than 10,000 lbs. This weight limitation permits towage by a single axle commercial vehicle (e.g., ¾ ton pick-up truck). Other options include, but are not limited to, rail cargo, shipboard, or truck mounted systems.

Preferably, the storage vessels 1 are overwrapped carbon fiber composite vessels. Other lightweight large-capacity vessels also may be used. Lightweight vessels are used because standard steel or hoop wrapped steel vessels have comparatively higher masses which are not conducive to over-the-road transport by light vehicles (e.g., ¾ ton pick-up truck). Overwrapped carbon fiber vessels have distinct advantages, because they are very stiff (high modulus), very tough, and are not subject to many of the damage mechanisms (e.g., hydrogen embrittlement) as are steel vessels.

At least two storage vessels 1 are included in the array of storage vessels so that fueling can occur by cascading pressures, thereby allowing the highest possible differential pressures to develop, thus increasing gas flow rates during vehicle tank filling, and minimizing the time required for vehicle tank filling. Nine storage vessels are used in the embodiment illustrated in FIGS. 1–3.

The storage vessels 1 are supported by a support system 2 and a lightweight frame (not shown) fabricated from an aluminum alloy, composite, or other high-strength lightweight material. The frame is constructed to withstand a multiple of "G" forces, as required by DOT standards. The support frame can fix the storage vessels by either strap mounting or supporting the storage vessels from the end "boss" fitting. The support frame also is designed to protect the valves (facing rear of trailer) from shear, should the mobile fueling station 20 be involved in a collision with a stationary object or moving vehicle. It also is designed to let the fore end float relatively free in the longitudinal direction, thereby mitigating any damage caused by expansion and contraction due to temperature changes. Extension of the high-strength lightweight frame beyond the valves acts to imbed the valve bodies within the skeleton of the frame, thereby protecting the valves from impact and shear loads.

Figure 4:
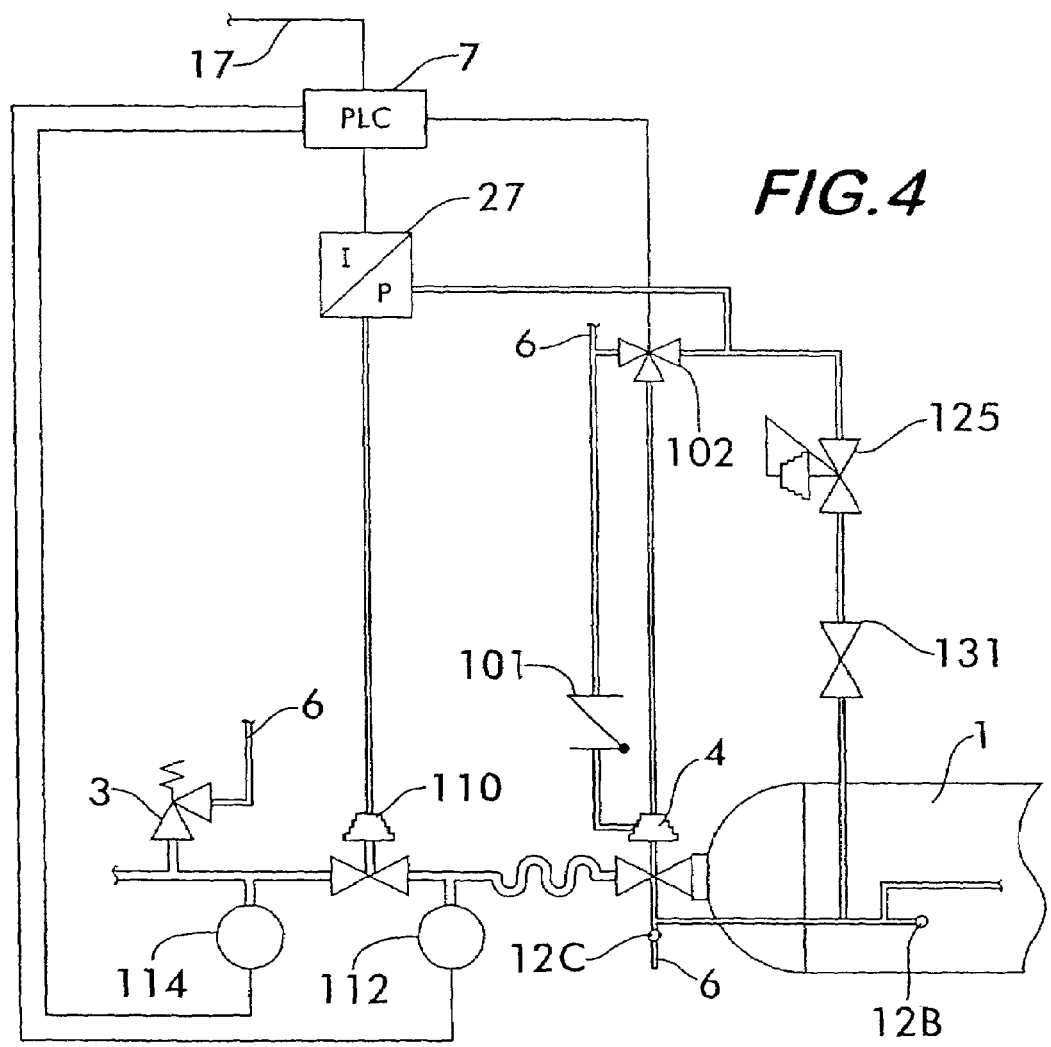
FIG. 4 is a schematic diagram illustrating some of the piping and instrumentation in communication with a programmable logic controller (PLC) in one embodiment of the present invention.
Figure 5A:
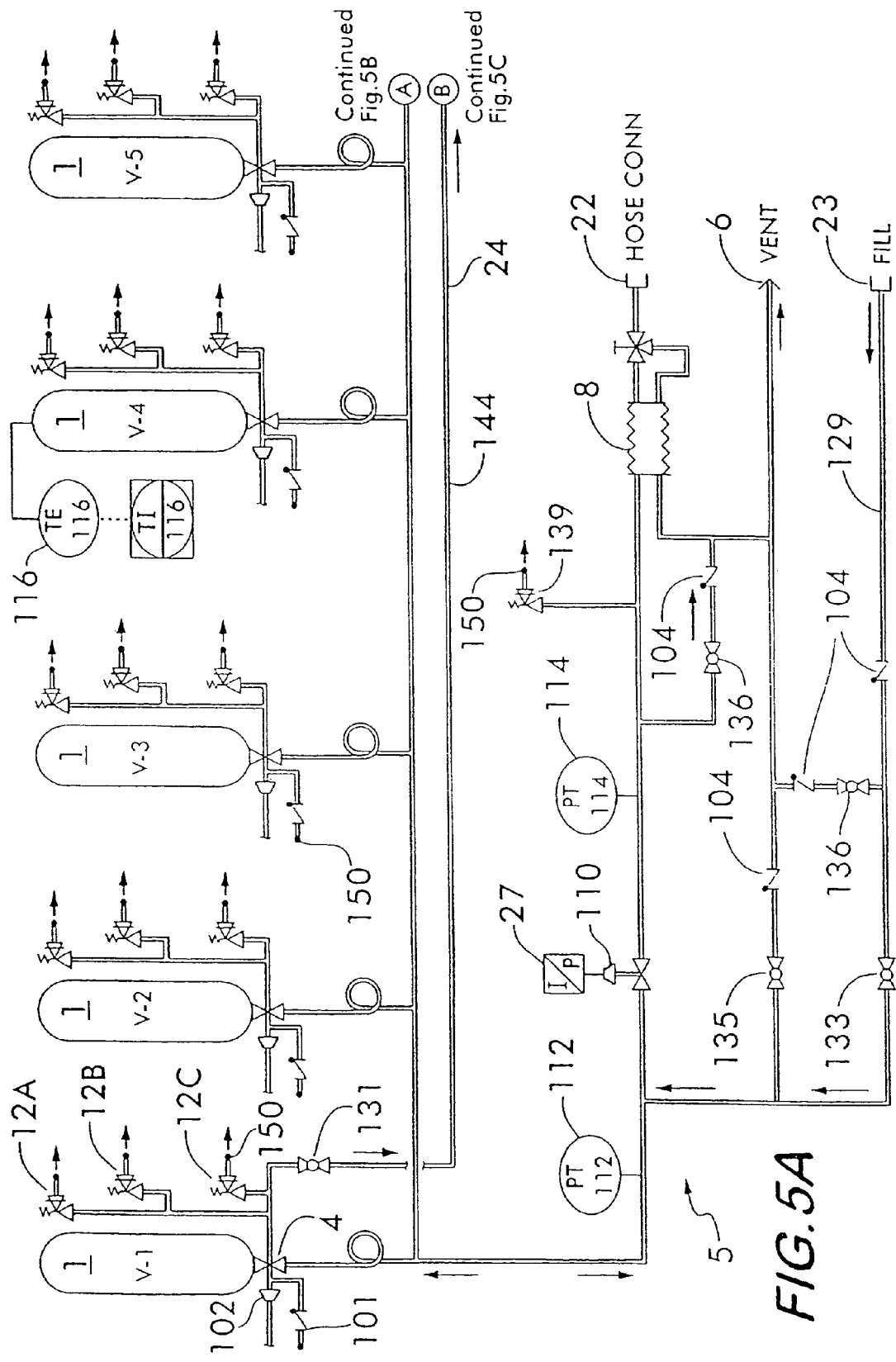
FIGS. 5A–5C illustrate a process flow diagram for one embodiment of the present invention.
Figure 5B:
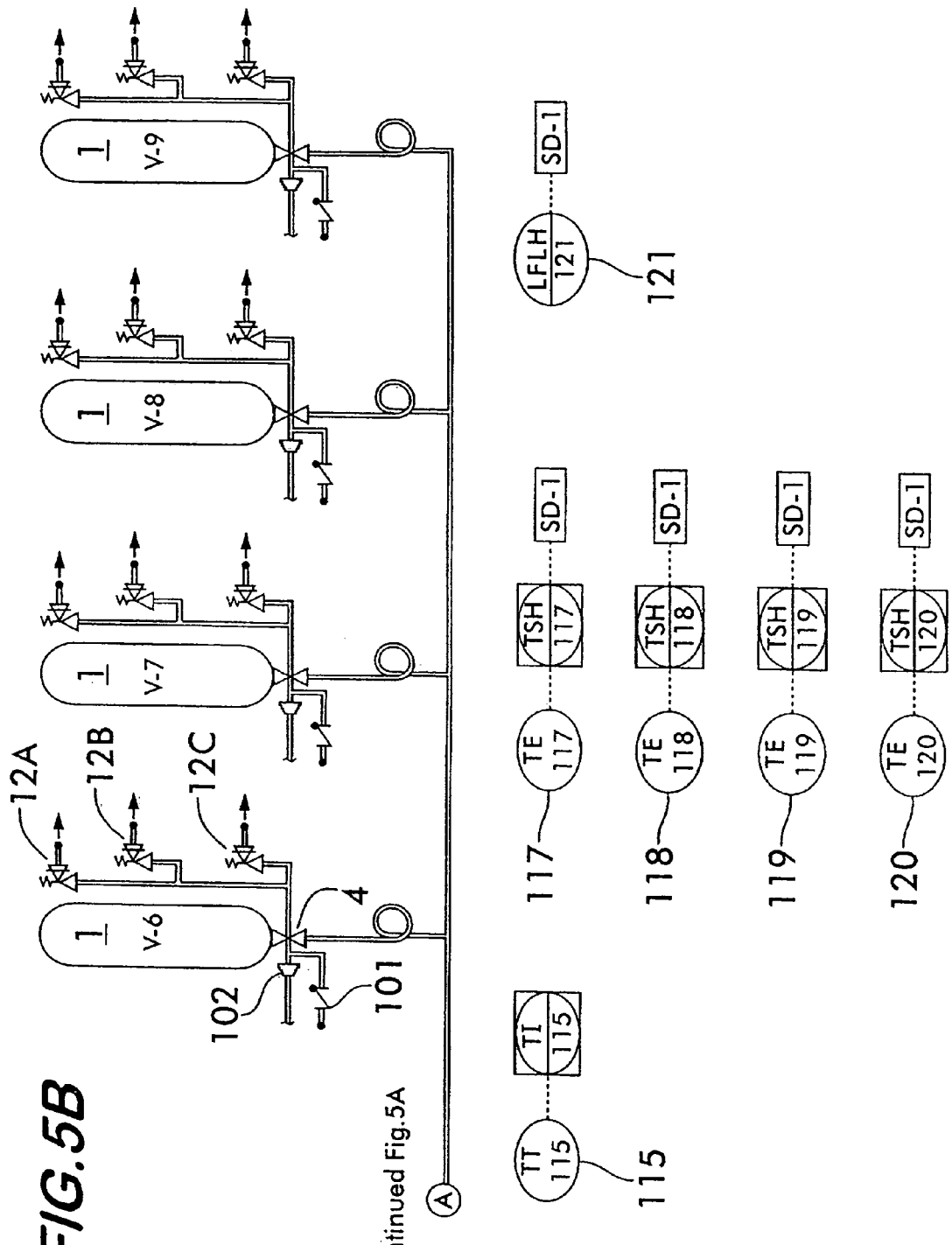
Figure 5C:
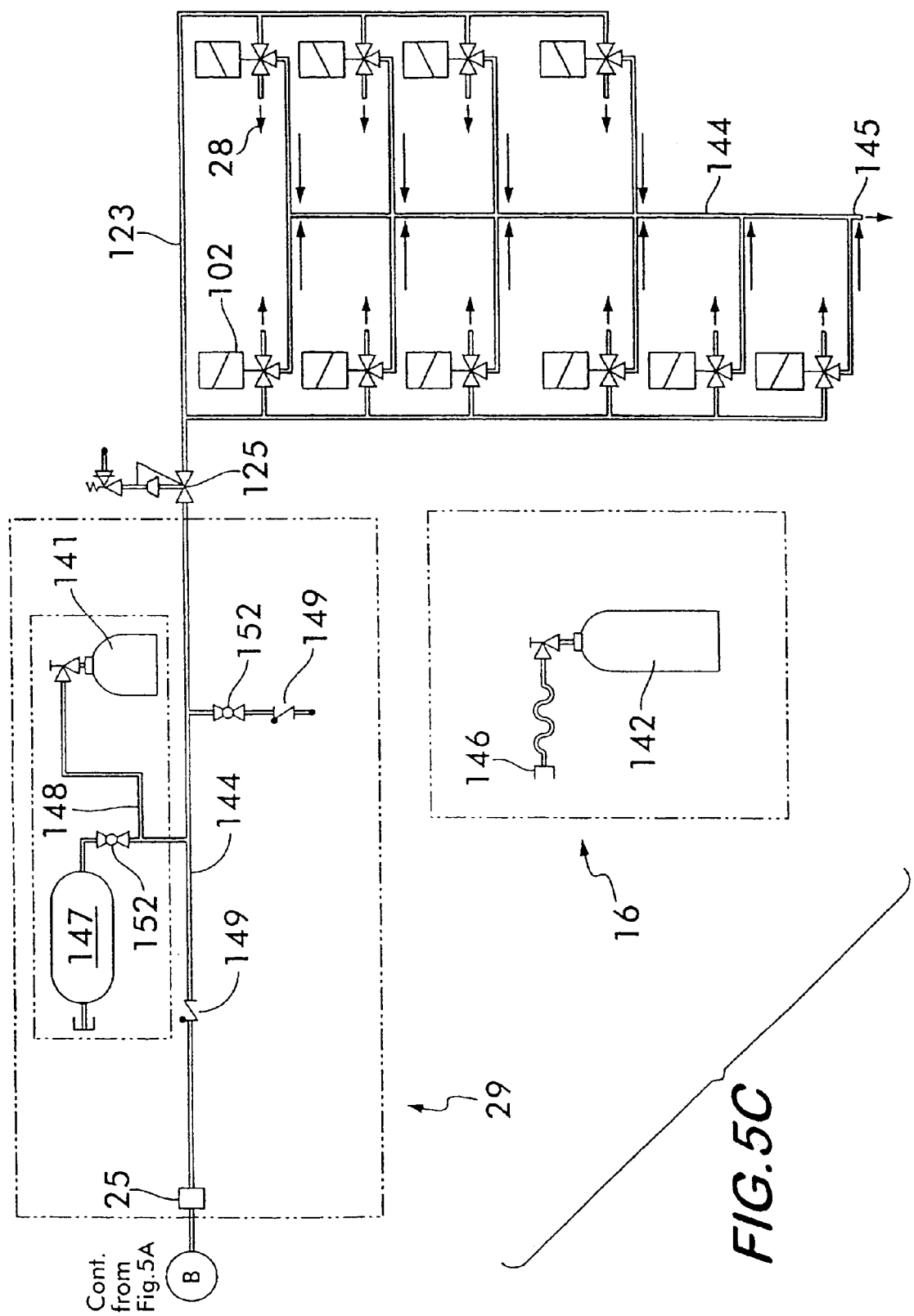

FIG. 5 illustrates a process flow diagram for one embodiment of the invention. A discussion regarding the instruments, valves, etc. is provided below. FIG. 4 illustrates some of the instruments and valves associated with a storage vessel 1 and the lines by which signals are transmitted between the PLC and those instruments and valves.

Referring to FIG. 5 (5A-5C), a first pressure transmitter 112 directly measures the pressure in the high-pressure manifold 5, and indirectly measures or reflects the pressure in any of the storage vessels (V1–V9) when the associated actuating valve 4 is open for a storage vessel. Pressure drop occurring at a first pressure control valve 110 is much larger than in the rest of the system, validating this assumption of the indirect measurement.

A second pressure transmitter 114 directly measures the pressure in the manifold 5 and hose 8 assembly downstream of the pressure control valve 110, and indirectly measures or reflects the pressure in the vehicle tank (not shown).

The pressure control valve 110 is used to regulate the flow rate of hydrogen in the vehicle tank. Excessively high flow rates (and thus high pressure rates) in the vehicle tank generate heat that could damage the tank liner. Therefore, the pressure control valve maintains manageable heat input into the vehicle tank by maintaining acceptable rates of pressure increase.

A temperature transmitter 116 is placed on one of the storage vessels 1, such as storage vessel V4, as shown in FIG. 5. The temperature transmitter may provide temperature data used in state equations to calculate mass and density. A temperature-measuring device 115 provides temperature data for hydrogen in the vehicle tank.

Various valves are included in the system. A check valve 101 on each storage vessel (V1–V9) inhibits reverse flow of gas. A first hand valve 131 is a manually operated valve for the on/off state. An electrically actuated solenoid valve 102 associated with each storage vessel either pressurizes or depressurizes a gas-operated actuating valve 4 on each storage vessel. Miscellaneous check valves 104 and hand valves 136 shown in FIG. 5 are included for safety and control of flows in the system.

The mobile fueling station 20 is filled in the following manner. First, the PLC requests a signal from pressure transmitter 112 to determine if the residual pressure is above X psig, thereby verifying that there is positive pressure and no ingress of air into the system. The PLC then energizes the solenoid valve 102 for storage vessel V1, allowing instrument gas pressure to fill the instrument gas line 24 where service gas pressure from the pressure relief device line 123 on storage vessel V1 is regulated in a second pressure control valve 125 down to 80 psig. The hydrogen at 80 psig then flows to the actuating valve 4 for storage vessel V1 causing the actuating valve to open. Upon opening, hydrogen gas from the fill line 129 (connected to a hydrogen source via fill connector 23) enters the high-pressure manifold 5 through a second hand valve 133 and flows into storage vessel V1 until pressure transmitter 112 reads 7,000 psig. When pressure transmitter 112 reaches 7,000 psig, the pressure energizes the solenoid valve 102 for vessel V2, causing equalization between storage vessel V1 and storage vessel V2, and then pressurization of both vessels back to 7,000 psig.

The process is then repeated. This time the solenoid valve 102 for storage vessel V3 opens causing the actuating valve 4 for storage vessel V3 to open. Equalization then occurs between storage vessel V1, storage vessel V2, and storage vessel V3. This process is repeated until the last storage vessel V9 is filled to 7,000 psig.

When the system reaches 7,000 psig with all actuating valves 4 for all storage vessels (V1–V9) open, the PLC commands the solenoid valves 102 for all vessels V1–V9 to de-energize, thereby closing the actuating valves 4 for all of the vessels V1–V9.

When the system is at full capacity, a third hand valve 135 is closed manually. Hand valve 131 is closed, thereby completing isolation of all of the storage vessels (V1–V9) from the environment.

Several safety measures are incorporated in the system. For example, temperature activated pressure relief devices (12A, 12B, 12C) are provided on each storage vessel (V1–V9). If the local temperature increases above 217° F., an internal melt plug liquefies, allowing movement of the plug, causing a communication between the vessel contents (hydrogen) of the storage vessel and the vent system.

Each storage vessel 1 also has a vent line on the bonnet of its gas-actuated actuating valve 4. If the valve internals become damaged, escaping gas is piped to the vent system 6 instead of leaking into the trailer vessel compartment.

Safety pressure relief device 139 is part of the overpressure protection system 3, which protects the system from over pressurization. This device is set at about 6,350 psig and will lift upon system pressure reaching that value, thereby allowing hydrogen to be vented safely into the dedicated vent system 6. The "dot" 150 on the discharge of each safety pressure relief device and check valve 101 indicates that the device outlet or valve is in communication with a vent header of the vent system.

Heat sensors 117–120 are provided in case of high temperatures (e.g., due to fire) in the classified environment. Upon receiving a signal form the heat sensors, the PLC will shut the system down.

Operation of the mobile fueling station 20 to fill a vehicle (not shown) is set forth below for the embodiment shown in FIG. 5. Hand valve 131 is opened to allow gas pressure to accumulate which can be used to actuate the actuating valves 4 for each of the vessels (V1–V9) and the pressure control valve 110. The PLC determines whether these permissives are in place. If so, the fill process continues.

Pressure control valve 110 is opened to 7,000 psig. A signal to solenoid valve 102 for storage vessel V1 energizes the solenoid valve for about one second, thereby allowing instrument hydrogen regulated to 80 psig to actuate the actuating valve 4 for storage vessel V1 for about one second. The hydrogen gas from storage vessel V1 pressurizes the manifold 5 and hose 8 assembly for about one second. The PLC then sends a command to de-energize the solenoid valve 102 for storage vessel V1, thereby closing the actuating valve 4 for storage vessel V1.

The PLC repeats the process with the solenoid valve 102 and actuating valve 4 for vessel V2, pressurizing the manifold 5 and hose 8 assembly at the higher pressure at the cascade step for storage vessel V2. At each step the pressure measured at pressure transmitter 112 is stored in the PLC.

The process is repeated until storage vessel V9 has equalized with the manifold 5. The actuating valve 4 for storage vessel V9 is then closed. These steps validate the safety of the system, provide data to assess the mass of hydrogen in each storage vessel, and pressurize the manifold 5 and hose 8 assembly to a pressure high enough that equalization with the vehicle (upon connection) will occur from a small volume into a large volume (quickly).

The connection of the hose 8 with the vehicle is then made via hose connection 22. The manifold 5 and hose 8 depressurize, equalizing with the vehicle tank to a steady-state value. The PLC monitors the pressures at pressure transmitter 112 and pressure transmitter 114 making sure that no leaks exist.

The PLC then sends a signal to the solenoid valve 102 for storage vessel V1 to actuate the actuating valve 4 for storage vessel V1, allowing the control of storage vessel V1 to depressurize into the vehicle tank. When the differential pressure between the open vessel (measured at pressure transmitter 112) and the vehicle (measured at pressure transmitter 114) is less than 200 psig, the PLC de-energizes the solenoid valve 102 for storage vessel V1, closing the actuating valve 4 for storage vessel V1.

The PLC then commands the solenoid valve 102 for storage vessel V2 to open, repeating the process, except at a higher pressure. Upon completion of this step, the equalization pressure will be at a higher level than in the step before. The process of opening and closing successive valves is repeated until the fill is complete (density>1.5 lbs per cubic foot) or the pressure in vessel V9 and the vehicle tank have equalized at the highest pressure possible.

As shown in FIG. 4, the storage vessels are protected from overpressurization in two ways—by a safety pressure relief device 139 on the vessel overpressure protection system 3, and by the array of thermally activated pressure relief devices (12A, 12B, and 12C).

The safety pressure relief device 139 is in communication with the high-pressure manifold 5, which is in direct communication with the actuating valves 4 on each of the storage vessels (V1–V9). The pressure relief device discharge is in communication with the flammable gas vent system 6, which exits the trailer through the roof 15. Alternatively, the roof may be made of a gas-permeable material, thereby reducing the need to use the roof vent.

The thermally activated pressure relief devices (12A, 12B, 12C) are attached to each end of, and in the center of, each composite storage vessel 1. Each pressure relief device (PRD) is designed to discharge the contents of its associated storage vessel when the temperature rises above a predetermined limit (e.g., 217° F.), a situation that could occur if a fire existed. The low melting eutectic plug within the PRD is not in the gas path, and therefore cannot re-solidify and block the gas path. Each PRD is in direct communication with the high-pressure hydrogen contents of its associated storage vessel. The discharge of each PRD is vented to the flammable gas vent system 6, which exits the roof 15 of the trailer.

The piping of the flammable gas vent system 6 is designed such that there is limited backpressure in the system during a controlling event (e.g., safety PRD 139 opening, venting 7,000 psig hydrogen). It is also designed to vent in a vertical direction and to prevent detonation within the non-purged vent pipe.

In an alternative embodiment, the center PRD 12B may be eliminated if the inter-vessel spaces within the bank of composite storage vessels 1 is filled/stuffed with an insulation material (e.g., pearlite, glass wool). Use of insulation and/or other void filling insulation materials, including intumescent coatings, inhibit flame impingement on the composite storage vessels 1 should a leak occur. Also, removal of the center PRD 12B and the associated tubing reduces the probability of a hydrogen leak by reducing the number of fittings and length of tube/pipe under constant hydrogen pressure. In this embodiment, lowering the probability of leakage by reducing the number of PRD's, coupled with inhibition of flame impingement in the center of the vessel by use of pearlite insulation, increases the margin of safety for the unit.

The inside of the fueling station 20 is considered a classified area, with the exception of a front storage space. An isolation wall 13 prevents the migration of hydrogen gas into this area. All electrical components in the classified area are non-sparking and comply with NFPA Class 1 Div. 2 group B requirements. The isolation wall 13 separates the classified area 18 from the non-classified area 19, thereby allowing the use of non-sparking components, as long as the components are at least 15 feet away from the roof-mounted vent of the gas vent system 6. The isolation wall is sealed, thus preventing ingress of hydrogen from the storage vessels 1

A 12-volt electrical system powers the running lights of the trailer and energizes the dispenser panel including PLC 7. The PLC is responsible for controlling the transfer of high-pressure hydrogen gas to the fuel storage tank of a hydrogen-powered vehicle, and for controlling the recharging of the storage vessels 1 with hydrogen. The PLC performs this function by activating the solenoid valves 102 which in-turn permit the pressurization of lines 28 feeding the actuating valves 4 on each of the composite storage vessels 1. The actuating valves are energized by hydrogen fed from the composite storage vessel PRD lines, but regulated to 80 psig.

The PLC is powered by a 12-volt deep-cycle battery 11 is located in the non-classified area 19 near the front of the trailer. The self-contained system provides its own mechanism for maintaining charge on the battery—preferably a panel of photovoltaic cells 10 mounted to the exterior on the roof 15 of the trailer. The 15-volt output of this panel is wired to the battery, keeping it charged. As an option, a fuel cell may be utilized for production of electricity. The fuel cell could recharge the battery, or could power the PLC on its own. (Other means, such as wind turbine generation or the power system of the "to-be-filled" hydrogen-powered vehicle could be used to maintain the battery charge and energize the PLC.)

To use the mobile fueling station 20, hand valve 131 must be opened to supply gas pressure to the solenoid valves 102. High-pressure hydrogen is reduced to 80–90 psig by pressure control valve 110 for actuation of the solenoid valves on each of the storage vessels (V1–V9). This action is performed once the mobile fueling station has been disconnected from the tow vehicle. The actuating gas may be hydrogen from one of the storage vessels, or it may be hydrogen or any inert gas (e.g., nitrogen) from an additional cylinder 141 dedicated to this task. In either case, the gas is delivered to the actuating valves 4 via the instrument lines 144 shown in FIG. 5. The instrument lines vent at 145. As an alternative, electrical solenoid valves could be used, provided they carry a Class 1 Div. 1 or Class 1 Div. 2 group B NEC designation.

FIG. 5 illustrates both optional nitrogen actuation 16 and optional or alternative hydrogen actuation 14. The nitrogen actuation includes a cylinder 142 of nitrogen gas which is connected to instrument line 24 via connector 146.

The alternative hydrogen actuation 14 includes a cylinder 141, which is connected to the primary lines for instrument hydrogen via line 148. The hydrogen actuation system includes a surge bottle 147 and miscellaneous check valves 149 and hand valves 150 for safety and control of flows in the system.

During filling of a fuel tank of a hydrogen-powered vehicle, the communication cable 17 hook-up to the hydrogen-powered vehicle is verified, acting as a permissive allowing the next step to commence. Communications may be wireless (e.g., infrared, radio frequency, etc.). A grounding connection is made between the self-contained mobile fueling station 20 and the hydrogen-powered vehicle using a provided cable (not shown). This prevents static discharge, which could serve as a potential ignition source.

Prior to initiating a fill by pressing a start button, entering a personal identification number (PIN), or other process, the system reads data coming in from the PLC. The PLC determines the pressure in each of the storage vessels 1 by assessing the signal coming in from a combustible gas monitor (not shown) within the classified area 18. If at this time, or any time during the fill, the concentration of hydrogen is sensed to be greater than 25% of the lower flammability limit (LFL) for hydrogen, the system shuts down. The program then asks the operator to verify that the hydrogen-powered vehicle to be filled (the "fill vehicle") has been turned off.

To allow the system to operate, hand valve 131 permitting regulated high-pressure hydrogen to energize the actuating valves 4 must be opened. Upon initiating the fill process, the PLC then sends a signal to de-energize each of the solenoid valves 102 controlling each of the actuating valves 4 on each of the storage vessels (V1–V9). A counter is reset, and a query asks the operator for his/her PIN. The operator is given three chances to input a correct PIN. After a third input of an erroneous PIN, the system will shut down, not allowing a fill to be initiated. Upon input of a correct PIN, the program will ask the operator to lift or rotate a lever, thereby grounding himself with the fueling station 20. (Grounding also may occur when the operator opens the hatch-back door 21 to operate the unit.)

Also at this time the PLC scans the system for signals from the fill vehicle. If none are received, then the program commences with a "non-communication" fill. If signals from the fill vehicle are received, then a "communication" fill occurs.

In a "non-communication" fill, the pressure control valve 110 on the high-pressure manifold 5 is given a command to regulate gas to the maximum fill pressure. The PLC then commands each of the actuating valves 4 to open sequentially for a period of about one second. At each of these steps, the storage vessel gas temperatures and the equilibrium pressure in the manifold 5 and the hose 8 are recorded and stored by the PLC. The stored values are further manipulated by use of the second viral coefficients of hydrogen to produce the mass of hydrogen in each storage vessel (V1–V9). When the last actuating valve on the last storage vessel V9 has cycled, the total hydrogen mass of the system is calculated.

The fueling nozzle 9 is then attached to the fill vehicle, being sure that the integral "double block and bleed" connection is firmly in place and locked in position. The PLC senses the status of this connection by monitoring the pressure response of the manifold 5/hose 8 and the vehicle tank system. Verification of pressure stabilization provides safety interlocks for hose failure or leaks in the system. If the system pressure does not equilibrate, as monitored by pressure transmitter 112, then the system shuts down. When the system equilibrates, the values of pressure and gas temperature (as measured by sensor 116) are mathematically manipulated to determine the mass in the vehicle tank.

The time required to fill the vehicle tank is calculated based on the difference between the manifold 5/hose 8 equilibrium pressure and the final fill pressure required, and on the ambient temperature (measured by temperature indicator 115). To mitigate overheating the vehicle tank, one of three fill rates is selected. If the ambient temperature is less than 15° C., the selected fill rate is 15 bar/min. If the ambient temperature is between 15° and 30° C., then the selected fill rate is 7.5 bar/min. If the ambient temperature is above 30° C., then the selected fill rate is 5 bar/min. The actuated pressure control valve is controlled by the PLC to provide the temperature dependent rate of pressure increase as a linear function of time as determined earlier by differences in manifold and final fill pressure and the ambient temperature.

The difference between the non-communication fill and a communication fill is two-fold. First, communications signals from the hydrogen-powered vehicle fuel tank provide the PLC of the mobile fueling station 20 with instantaneous pressure and temperature signals instead of relying on the hose/manifold pressure transmitter (PT-114) and ambient temperature values. Second, the I/P control sub-routine provides for a much larger pressure ramp rate in the communications fill when compared to the non-communications fill. The ramp rate is maintained at much higher values until the temperature measured at the hydrogen-powered vehicle fuel tank reaches a high set point. Upon reaching this high temperature, the I/P controller commands the pressure control valve 110 to temporarily pause at the instantaneous pressure level. The pause remains in effect until the instantaneous temperature at the vehicle fuel tank has dropped to a value 5° C. below the set point, at which time the pressure ramp rate increases, returning to its former high filling rate.

The rate of pressure increase must be enabled by an increasing pressure in the manifold 5 to keep the pressure differential between the manifold (as measured by pressure transmitter 114) and the vehicle tank (as measured by pressure transmitter 112) significantly high to maintain flow rates that result in a quick fill. If the differential pressure drops to a value less than 200 psig, then PLC commands are given to close actuating valve (x) and to open actuating valve (x+1), thereby sequencing the tanks and allowing a cascade arrangement to be afforded. The cascade fill arrangement has two major benefits:

1. cascade filling provides a greater number of fills at maximum pressure; and
2. cascade filling minimizes of the time required for filling.

At the beginning of the initial fill, every storage vessel 1 is at its maximum design pressure. Upon connection to a fill vehicle tank, and the subsequent opening of the first storage vessel, pressure equalization between the fill vehicle tank and the first storage vessel occurs. When the differential pressure across pressure control valve 110 is less than 200 psig, the actuating valve 4 to the now "depleted" storage vessel closes and the actuating valve on the next storage vessel is opened, allowing the process to repeat.

At each step, the pressure in the open storage vessel is decreased from its starting value but is higher than the final pressure of the storage vessel before it in the sequence. Pressure increases from the first storage vessel to the last storage vessel, as each storage vessel equilibrates at a higher pressure than the preceding storage vessel. If the cascade filling scenario is not used, then the total pressure of the system will equalize at lower values during each fill until a point where the highest system pressure will not be enough to fully fill a vehicle tank.

In a cascade system, high pressure is conserved, as each subsequent storage vessel equalizes at progressively higher pressures. Also, at each consecutive step, compressed hydrogen flows at a rate significantly faster than experienced at the end of the previous step because of the higher pressures encountered. This use of cascading pressures allows filling at a greater rate with less heating in the receiving tank when compared to filling from one pressure.

While the filling is commencing, the system continues to sense for any breaks in the hose 8, looking for depressurization (assessed by pressure transmitter 112). Also, the system monitors the "virtual hydrogen flow," a parameter being generated by subroutines using the above-described parametric relationships based on hydrogen compressibility, system pressures, and gas temperature. Continuous computations are made comparing the calculated mass loss from the trailer with calculated mass gain in the vehicle. If at any time the virtual hydrogen flow exceeds a value determined to be consistent with a full tank, a shutdown occurs.

Commands to adjust the I/P controller 27 on the programmable pressure control valve 110 are given to maintain flow rates to support the predetermined time to fill. If the instantaneous flow rate is above or below set values, the system shuts down. Pressure control valve 110 receives its pressure input signals from the I/P controller, which receives milliamp signals from the PLC. Its I/P pressure input signal is provided by gas pressure, the gas being supplied from the same regulated feed to the actuating valves 4. This process is repeated until the desired hydrogen density is attained in the receiving tank.

Hydrogen density is used as the control factor because it can be determined knowing only the pressure, temperature, and composition of the gas. Second order equations using viral coefficients help determine the compressibility factor for hydrogen. The compressibility factor of hydrogen provides a relationship between ideal and real conditions, allowing simple parametric equations to be used to calculate mass as a function of pressure, volume, temperature, and composition. Use of viral coefficients provides a convenient method of determining a precise measurement of the mass, and thus the density of hydrogen at different temperatures and pressures.

At the point where calculated hydrogen density exceeds a value consistent with a full tank, the fueling is finished and the PLC will not allow additional hydrogen gas to flow. Filling is complete.

The interlocked solenoid-actuated, hydrogen energized on/off actuating valves 4 permit fueling to occur without requiring an operator to manually open and close valves. Upon fueling, the PLC sends signals that energize valves associated with the particular step being performed. All other valves are closed. The PLC program contains instructions identifying which solenoid valves 102 belong to which actuating valve (associated with which storage vessel). As the fueling occurs, a programmed sequence of valve openings and closings insures exact repetition.

Use of manual valves would subject the operator to an enclosed space environment, which is inherently unsafe. Also, the use of manual valves would place reliance on the operator to open/close the right valve at the right time and in the correct sequence. Manual operation would introduce operator error and require significant training. The PLC automated interlocked valve control system of the present invention reduces the amount of training required, eliminates or minimizes the possibility of operator error, and allows for a faster fill.

In a preferred embodiment, the PLC also controls the commercial aspect of the fill. The operator (e.g., vehicle driver) is initially required to lift the hatch-back door 21 on the rear of the mobile fueling station 20, thereby gaining access to the vehicle grounding conductor (not shown), the vehicle communication cable 17, the fueling hose 8 and the fueling control panel keypad (not shown). The raised hatch-back provides the operator with some shelter from the elements (e.g., hot sun, rain, snow, etc.). The operator uses the grounding connector to create a circuit between the fueling station and the vehicle to be fueled, thereby mitigating the possibility of static discharge and possible fire. The operator then enters a Personal Identification Number (PIN) at the start of fueling. He/she also unreels and connects the communication cable so that the PLC can assess the storage vessels 1, the initial temperature and pressure of the fuel storage tank of the vehicle, and the condition of the vehicle fuel system. This connection may be wireless in other embodiments.

Upon successful input of the PIN and connection of the communication cable 17, the PLC verifies that the operator has successfully grounded the vehicle, and that the nozzle 9 has been correctly placed/secured on the vehicle. When these permissives are satisfied, the fueling begins. Simultaneously an account of the mass of hydrogen transferred is displayed on a screen (e.g., a LCD readout). The units of transfer can be gallons, liters, or any other units. The charges may be ascribed to the PIN's entity.

A preferred embodiment includes an automatic call-out system (not shown) for the recharging of the self-contained mobile fueling station 20 with hydrogen gas when it is near empty. A wireless transmitter (powered by the electrical system of the fueling station) is activated when the hydrogen manifold pressure decreases to a predetermined value at the tier of highest pressure. Reception of this signal precipitates actions leading to the retrieval of the self-contained mobile fueling station 20 for recharging with hydrogen gas. It is also possible to monitor the fueling station in real time from a remote location to determine when it is near empty and should be recharged.

Recharging the storage vessels with hydrogen occurs at a central facility. The mobile fueling station 20 is parked near a compressor outlet (not shown). An operator then attaches the communication cable 17, and the grounding cable to the mating joints of the compressor outlet. A flexible hose of the compressor station is connected to the mating adapter 143 on the high-pressure manifold 5. An override for the interlocked valve control system is provided, and can be accessed by use of a special code sequence on the keypad interface of the PLC. The override opens each of the actuating valves 4 of each of the storage vessels (V1–V9) in sequential order starting with the lowest pressure storage vessel V1 in order to minimize equalization pressure losses. This override significantly reduces the time and power required to recharge the mobile hydrogen fueling station. When the lowest pressure storage vessel is at a specified target pressure, the valves are opened on each of the storage vessels at the next highest pressure. An additional permissive exists on the recharge system, such that if the pressure transmitter 112 reads less than 10 psig on the manifold, it will not fill. This prevents the introduction of hydrogen into a storage vessel that may contain air, thus lessening the potential for energy release due to combustion. Also, similar to calculations made during the vehicle fill, the system can sense whether there is a leak or break in any of the lines or fittings. If when filling, pressure in the storage vessels does not increase at a specified rate over a given time period, the system will shut down.

The mobile fueling station 20 is in contact with the compressor used to refill the storage vessels 1. The same connection that is made with the to-be filled vehicle tank during a fill is made with the compressor station. Upon reaching 7,000 psig, as measured at pressure transmitter 112, the compressor station shuts down.

Upon completion of a normal refill, all of the solenoid valves 102 are de-energized, closing the actuating valves 4 of the storage vessels (V1–V9). Also, hand valve 131 on the supply gas to the solenoid valves must be closed prior to transporting the mobile hydrogen fueling station 20.

Figure 6:
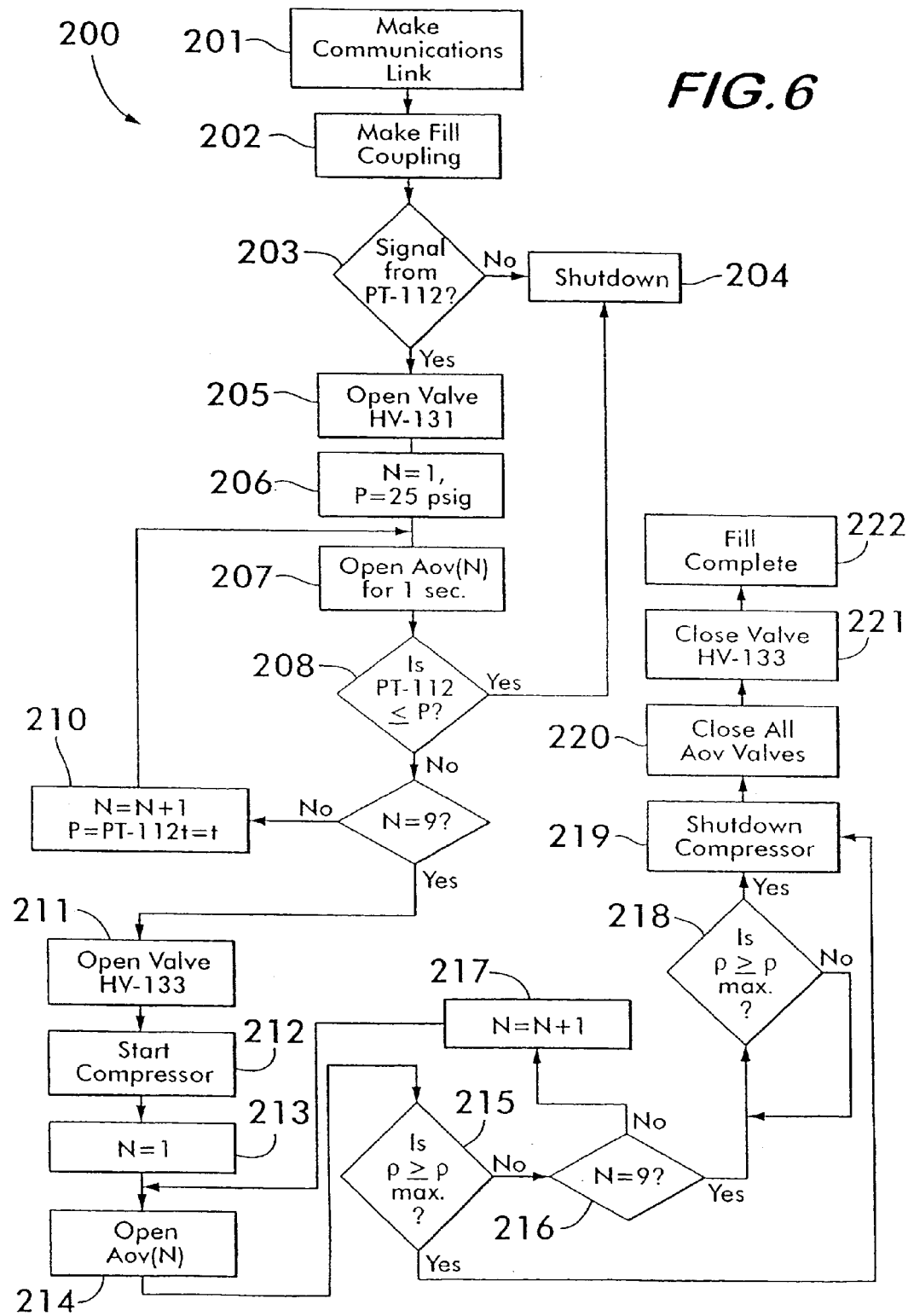
FIG. 6 is a block-flow logic diagram illustrating the refill operation for one embodiment of the self-contained mobile fueling station of the present invention.

FIG. 6 is a block-flow logic diagram illustrating a refill operation 200 for one embodiment of the self-contained mobile fueling station 20. Terms corresponding to the abbreviations in FIG. 6 are: "PT" is pressure transmitter; "HV" is hand valve; "P" is pressure; "N" is an integer from 1 to 9; "AOV" is an actuating valve; "t" is time; and "ρ" is gas density.

In step 201 a communication link is established between the mobile fueling station 20 and a compressor station using the same communication link 17 that is used with hydrogen-powered vehicles. In step 202 a hose connection is made between the high-pressure manifold 5 of the trailer and the compressor discharge hose. In step 203 the compressor station requires a signal (pressure transmitter 112) from the PLC. This requirement must be established to continue. If no signal is received, the refill cannot continue. If communication is established, the fill continues.

If no signal is received in step 203, the system is shut down in step 204 due to a lack of communications between the compressor station and the PLC of the mobile fueling station 20. If a signal is received, the manual valve (hand valve 131) must be opened in step 205 to provide actuating pressure to the actuating valves 4 of the mobile fueling station.

In step 206, a counter for the actuating valves 4 and associated storage vessels 1 is reset to 1 (the first vessel V1). Also, a minimum pressure value of 25 psig is input in step 206.

In step 207, the PLC commands actuating valve (N) to open for about one second to allow pressure transmitter 112 to determine if residual pressure exists in the storage vessel. If not, there is a high probability of a leak. In step 208, the PLC determines whether there is a residual pressure of 25 psig for storage vessel V1, and whether the pressure cascades upwards, as it should, for each subsequent storage vessel. If not, then a leak is presumed and the system is shut down (as in step 204). Otherwise, the system is ready to proceed with a fill of the fuel tank of the vehicle.

In step 209, the PLC asks whether the last valve is open (i.e., the counter is at 9). If not, it is necessary to loop back to step 207 via step 210. In step 210, prior to loop back to step 207, the counter (N) is increased by one count, and the pressure value P is set to the last pressure recorded in the high-pressure manifold 5. If a loop back was required, steps 207, 208 and 209 are repeated until the PLC receives a signal that the last valve is open (i.e., the counter is at 9).

In step 211, the operator opens hand valve 133, providing communication between the compressor station storage system and the storage system of the mobile fueling station 20. In step 212, the compressor starts, maintaining high pressure in the fill manifold.

In step 213, a second counter is set to 1. In step 214, the actuating valve associated with the present counter number is opened, allowing it to accept gas from the high-pressure manifold 5.

In step 215, the gas density (ρ) in the trailer storage system is calculated using a parametric relationship based on pressure, temperature, and compressibility to determine the fill capacity of the storage vessels 1. The manifold pressure is measured at pressure transmitter 112, the storage vessel gas temperature is measured at sensor 116, and the compressibility factor associated with the measured pressure and temperature is determined. If the density (ρ) is above a set point associated with the temperature compensated maximum fill pressure, then the shutdown sequence is initiated in step 219. Otherwise, the refilling continues in step 216.

In step 216, the PLC determines whether all of the storage vessels 1 are open to the manifold. If the counter is not at the last vessel (V9), then the system proceeds to step 217 where the vessel counter is advanced by one and the system loops back to step 214. (Steps 214, 215, and 216 are then repeated.) If the counter is at 9 in step 216, then the system proceeds to step 218.

In step 218, it is determined again whether the density in the storage vessels 1 is above a set point associated with the temperature compensated maximum field pressure. If it is, then a shutdown is initiated in step 219 (where the compressor is shut down). Otherwise, the system allows time for further equalization.

In step 220, the PLC commands closure of all storage vessel gas operated valves, thereby breaking the communication with the high-pressure manifold 5. Hand valve 133 is then closed in step 221, providing a double block for the trailer system and the trailer refilling is complete in step 222.

Figure 7:
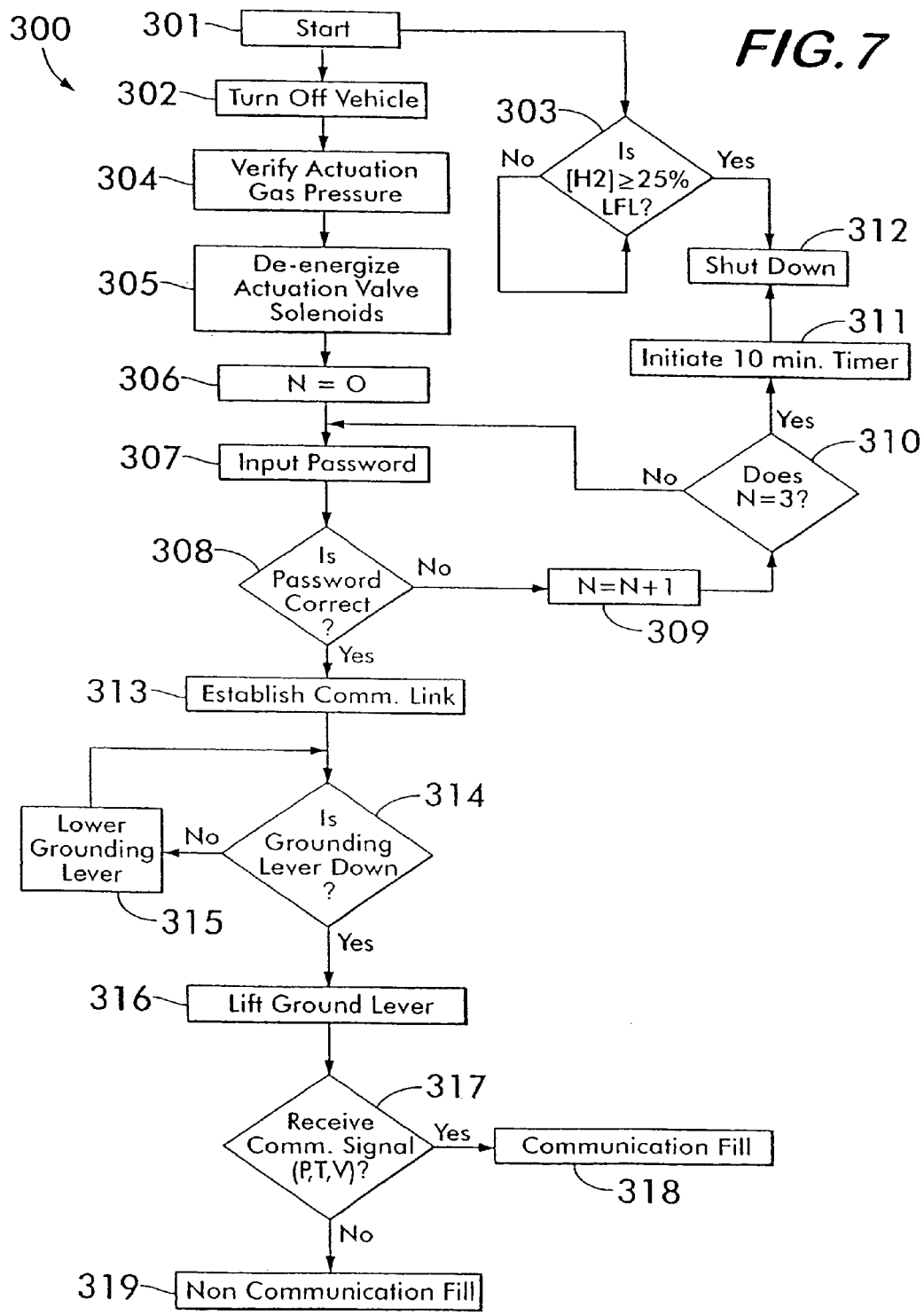
FIG. 7 is a block-flow logic diagram illustrating the preliminary steps for initiating fill for one embodiment of the self-contained mobile fueling station of the present invention.

FIG. 7 is a block-flow logic diagram illustrating the preliminary steps for initiating fill 300 of one embodiment of the self-contained mobile fueling station 20. The terms corresponding to the abbreviations in FIG. 6 also apply to FIG. 7. Additional terms corresponding to additional abbreviations in FIG. 7 are: "H2" is hydrogen; "V" is volume of the vehicle tank(s); and "LFL" is lower flammability limit.

Step 301 is the "start." In step 302 the operator is asked to turn the vehicle off, thereby reducing a chance for sparks and combustion. In step 303, a combustible gas monitor is asked to continuously monitor the storage area atmosphere at the start (i.e., beginning with step 1). The PLC asks whether a hydrogen concentration above the 25% lower flammability limit (LFL) has been sensed or detected.

In step 304 (a "permissive") the operator is asked to verify that the hand valve 131 is open and supplying gas to the actuating valves 4 and pressure control valve 110. In step 305, the PLC sends a signal to deenergize the solenoids associated with all of the gas-actuated actuating valves 4 on each of the storage vessels (V1–V9).

In step 306 a PIN input associated counter is reset to zero. The counter records the number of times a personal identification number (PIN) is erroneously input. The operator is asked to input his/her PIN in step 307. Then, in step 308, a decision is made to move forward or in the case of an invalid PIN, to return to the PIN input screen. The counter recording the number of invalid or erroneous "PIN" inputs is advanced by one in step 309. In step 310 a decision to allow another attempt at PIN input or to proceed to shut down is made based on whether the PIN was input three times erroneously.

In step 311 a timer is started, thereby inhibiting the operator from further attempts to fuel. The time is set to approximately 10 minutes to discourage an unwanted operator. The fill process is shut down in step 312 and cannot be restarted for approximately 10 minutes.

In step 313 the operator is asked to establish a communication link 17 with the vehicle. This may be performed by connecting a cable. Alternatively, a wireless communications link may be established using radio frequency or infrared technologies. In step 314, a decision is made. The fill can continue if the grounding lever is in the down position. If the grounding lever was not down, instructions to lower the lever are given to the fueling operator in step 315. The operator is instructed to lift the grounding lever in step 316, thereby dissipating static electricity and reducing the potential for ignition.

In step 317 a decision on how to continue is made based on whether a signal has been received from the vehicle requiring the fill. The signal includes the residual pressure (P) in the vehicle tank, the gas temperature (T), and the volume (V) of the tank.

In step 318, if a signal was received, then the program continues, but uses a subroutine associated with a "communications" fill. Otherwise, in step 319, if no signal was received, filling continues using a procedure associated with a "non-communications" fill illustrated in FIG. 8 and discussed below.

Figure 8A:
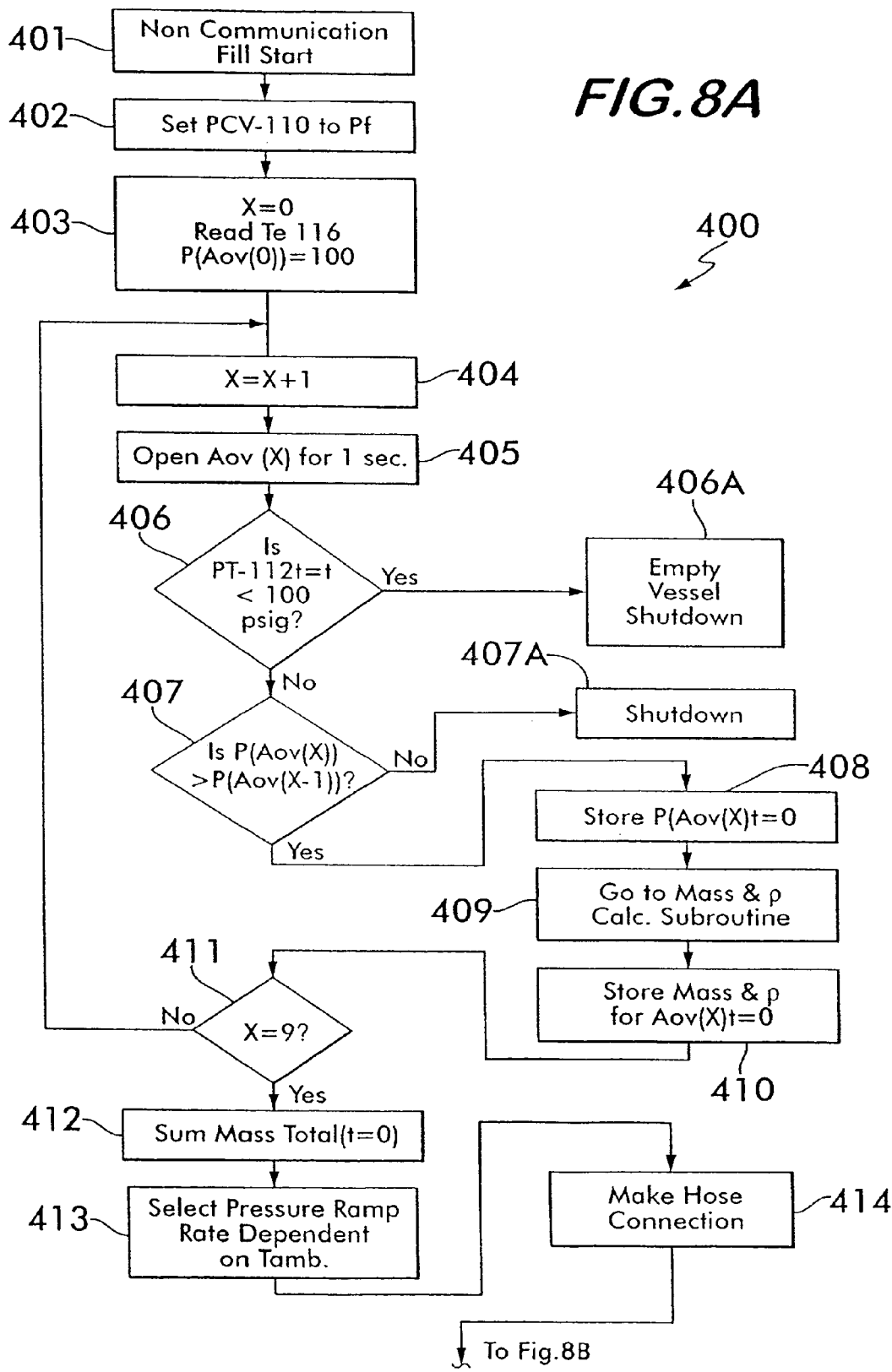
FIGS. 8A–8C illustrate a block-flow logic diagram of a non-communication fill for one embodiment of the self-contained mobile fueling station of the present invention.
Figure 8B:
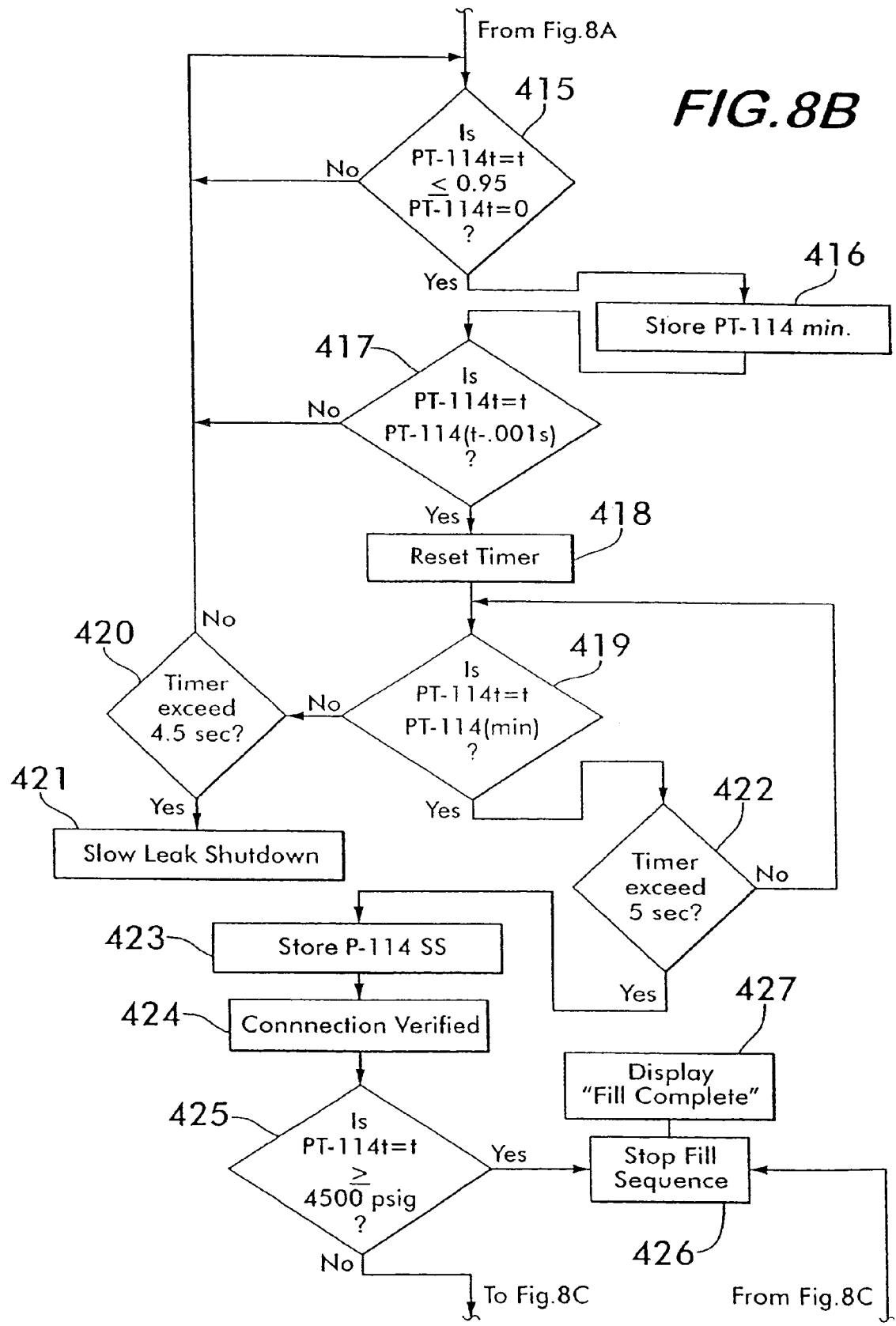
Figure 8C:
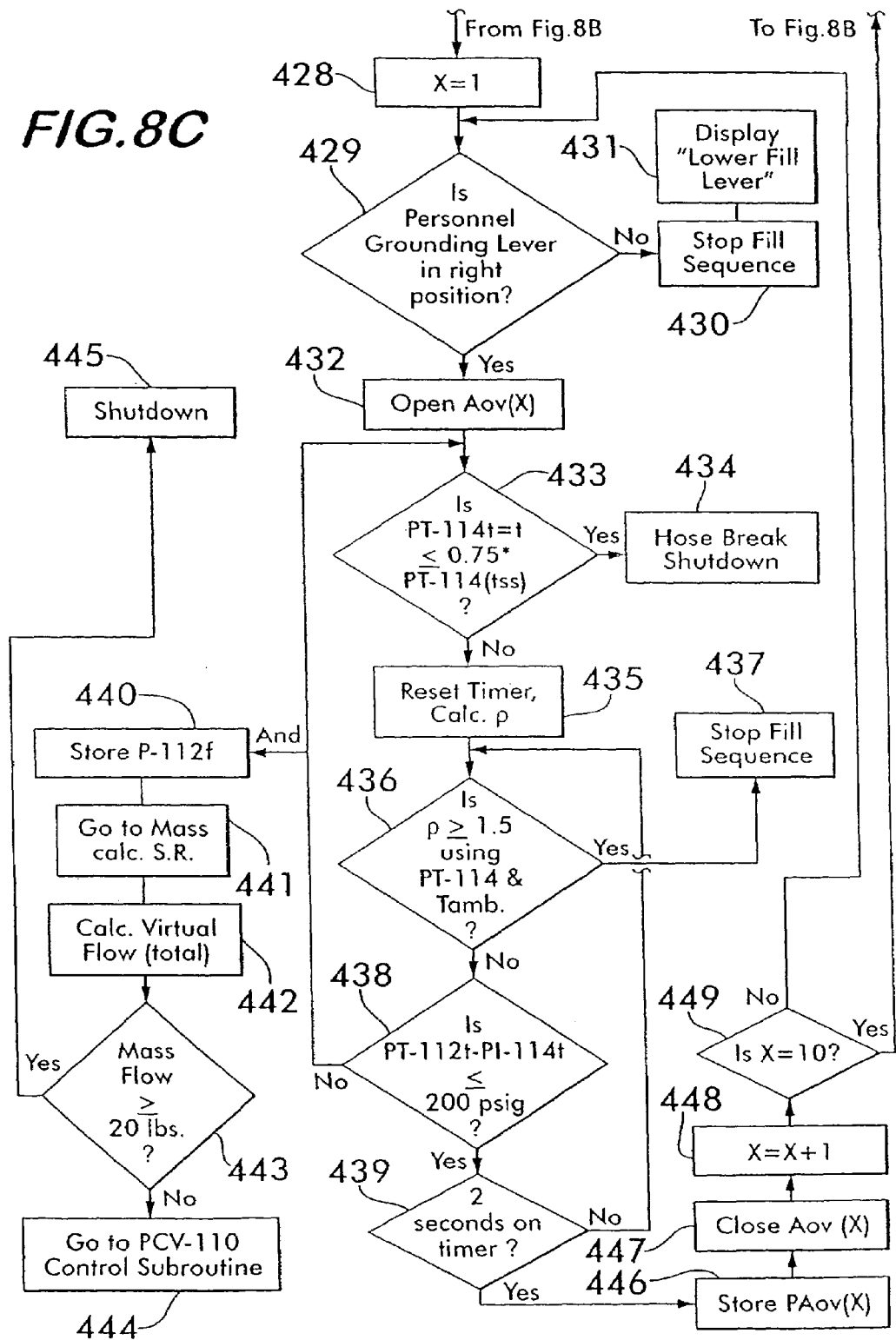

FIGS. 8A–8C provide a block-flow logic diagram illustrating a non-communication fill 400 for one embodiment of the self-contained mobile fueling station 20. The terms corresponding to the abbreviations in FIGS. 6 and 7 also apply to FIG. 8. Additional terms corresponding to additional abbreviations in FIG. 8 are: "PCV" is pressure control valve; "Pf" is maximum fill pressure; "ID" is identification; "X" is an integer from 0 to 10 (one more than the number of storage vessels); "TE" is temperature measuring element; "Tamb" is ambient temperature; "tss" is "t" at steady state; and "S.R." is sub routine.

In step 401 the non-communication fill start continues from the preliminary steps for fill in FIG. 7 (i.e., from step 319 in FIG. 7). In step 402 of FIG. 8, the pressure control valve 110 is opened to a position associated with the maximum fill pressure. In step 403 the vessel identification counter is set to zero. The temperature of the gas in the vessel associated with the actuating valve associated with the first storage vessel V1 is read via sensor 116 and a minimum acceptable pressure for the actuating valve of any storage vessel is set at 100 psig.

The vessel-sequencing loop is started in step 404 and advances the valve(s)/vessel(s) by one. In step 405 a command is given to open a gas-actuated actuating valve 4 on the associated storage vessel 1 in the sequence for one second. A decision is made in step 406. If the pressure (monitored by pressure transmitter 112) is less than 100 psig, then the unit shuts down is step 406A due to a system leak or empty storage vessel. This is to ensure that no air enters the manifold. If the pressure is greater than 100 psig, then the filling continues.

In step 407 a decision to continue is made based on whether the pressure in the storage vessel is greater than or equal to the pressure in the preceding storage vessel. If it is (i.e., no leaks) then the system continues with the fill. Otherwise, the fueling station 20 is shut down in step 407A.

In step 408, during the approximately one second, the equalized pressure in the vessel/manifold/hose is recorded and stored by the PLC. In step 409, using the equilibrium pressure and the temperature of the gas as recorded in TE-116, the values of the mass and density of the gas in the storage vessel are determined and recorded. These values are calculated knowing the storage vessel volume and the compressibility factor, which is calculated using a temperature and pressure based parameter and the second order viral coefficient. In step 410 the mass and density for the storage vessel are stored in a register that keeps track of the amount of gas in the storage vessel.

Another decision is made in step 411. If the system is not at the last storage vessel (i.e., at the actuating valve 4 for vessel V9), then the system loops back and repeats the process for the next storage vessel (i.e., steps 404–411). On the other hand, if the system is at the last storage vessel, then the system continues with the fill.

In step 412, the total mass of hydrogen in the system is calculated, and that value is stored. Step 413 selects the pressurization ramp rate as a function of ambient temperature (Tamb). If the ambient temperature is less than 15° C., then the system fills at a pressure ramp rate of 15 bar/min. If the temperature is greater than 15° C., but less than 30° C., then the fill takes place at 7.5 bar/min. If the temperature is higher than 30° C., then filling occurs at 5 bar/min. These ramp rates were chosen to minimize heating of the vessel liner. At the higher ambient temperatures, the vessel liners can be overheated, and the rate of heat increase must be controlled. This is done by reducing mass flow rate, mitigating heating by compression.

In step 414, the operator is instructed to make the "pressure-tight" hose connection. In step 415 the PLC determines whether upon making the connection the manifold pressure (as measured by pressure transmitter 114) drops to a value that is less than or equal to 95% of the pressure recorded in the hose 8/manifold 5 at the end of the one-second cycles. If it has, then the system continues to step 416. Otherwise, it is assumed that the connection was not made, and the operator tries again.

In step 416 the pressure in the manifold/hose/vehicle tank is stored in the PLC data bank as "PT-114 min." In step 417 the PLC determines if the pressure is still dropping. If it is still dropping, the PLC asks again. Once the value at pressure transmitter 114 equilibrates (i.e., satisfies >&=), then the filling continues.

In step 418 the timer is reset to zero. In step 419 the PLC questions whether the pressure at pressure transmitter 114 is at least equal to the minimum pressure stored in step 415 ("PT-144 min."). If not, then the system proceeds to step 420. Otherwise, it proceeds to step 422.

In step 420 if the pressure is lower than "PT-114 min.", the PLC asks whether the condition of continuously lower pressure has occurred for a period of 45 seconds. If not, then the loop starts over at step 415, establishing a new lower value of PT-114 min. If the condition has occurred for 45 seconds or more, the system continues to step 421. In step 421, a determination of a slow leak has been established, and a shutdown occurs.

In step 422, the PLC determines whether the minimum pressure has maintained its value and determines whether the pressure has maintained it value for 5 seconds. If so, the system is pressure tight, and the fill sequence advances to step 423, where the steady state pressure (P-114 SS) is recorded once the system has equalized. If not, it keeps looping back to step 419 until the 5-second period has been satisfied.

The equilibrium pressure in the manifold/hose/vehicle is established, and stored. From this value, an initial determination of mass can be computed. In step 424 the connection is verified, and the filling sequence continues.

Another decision is made in step 425. The PLC determines whether a "topping off" situation exists. If the pressure is greater than or equal to 4,500 psig, then the system goes to step 426. If the pressure is less than 4,500 psig, then the system goes to step 428.

At step 426 the fill sequence stops. No additional hydrogen will be transferred into the vehicle tank. The PLC display will show "Fill Complete" in step 427.

In step 428, since the pressure is less than 4,500 psig, the filling can continue. The counter associated with the fueling station vessel valves is reset to vessel 1 (V1).

In step 429 the PLC determines whether the grounding lever is still in the lifted position. If so, filling continues (step 432). Otherwise, the system goes to step 430 (stop fill sequence). The grounding lever is a way for the operator to terminate the fill, if required.

In step 430 the filling program is terminated due to the grounding lever being out of a normal fill position. The PLC will then display "Lower Fill Lever" in step 431.

In step 432 the actuating valve 4 associated with the position in the counter (1–9) is open, allowing hydrogen gas to pressurize the manifold 5. The gas flows into the vehicle through pressure control valve 110 at the pressure ramp rate prescribed, as based on the ambient temperature.

Another decision is made in step 433. The PLC determines if the pressure at pressure transmitter 114 is less than 75% of the value that it recorded as the steady-state pressure in step 423. If it is, then a hose break is assumed and a shutdown is ordered, and the system is shut down in step 434 (hose break shut down). Otherwise, the system advances to step 435.

In step 435 the timer used to maximize delta ΔP is reset (is ΔP<200 psig for two seconds?). The density is calculated based on the pressure at pressure transmitter 114 and the ambient temperature. A decision is made in step 436. If the density (calculated by using the pressure at pressure transmitter 114, ambient temperature, and the hydrogen compressibility factor) is greater than 1.5 lbs per cubic foot, then the fill is terminated in step 437 (stop fill sequence). (In step 437, "Fill Complete" is displayed on the PLC Display Panel.) On the other hand, if the density is 1.5 lbs per cubic foot, then the system proceeds to step 438.

A decision is made in step 438. If the differential pressure between the vessel that is presently open to the manifold 5 and the vehicle (PT-112–PT-114) is less than 200 psig, then the flow is expected to be slowing down. If this is so, the system goes to step 439. Otherwise, it loops back to step 433, allowing further equalization to occur. Note that in looping back the virtual flow totalizer is activated (see steps 440–445).

Another decision is made in step 439 where it is asked whether the differential pressure (PT-112–PT-114) has been less than 200 psig for 2 seconds. If it has, the system continues to step 446. Otherwise, it loops back to step 436, waiting for the 2 seconds to elapse.

In step 440, the value of hydrogen pressure in the manifold (PT-112) is stored. In step 441, using the second order viral equations, a calculation is made of the mass change in the storage system. In step 442 the total mass change since initialization of the fill is calculated.

A decision is made in step 443. If the total mass flow is greater than 20 lbs, then the system goes to step 445 where the system is shut down due to excessive flow (e.g., a leak in the vehicle tank). Otherwise, the system goes to step 444 where, using the value of mass transfer, and the pressures at PT-112 and PT-114, it calculates the step increase of the set point for the pressure control valve 110 required to maintain the previously input pressure ramp rate, thereby inhibiting overheating of the vehicle vessel.

In step 446 the value of the pressure in the open storage vessel 1 at the end of its fill step is stored. In step 447 a command is given to close the actuating valve 4 associated with the open storage vessel. In step 448 the vessel/vessel valve counter is advanced by one, thereby moving onto the next step in the fill sequence.

A decision is made in step 449 where it is asked whether the counter is at 10. If it is, this means that for a 9-vessel system the end of the pressure cascade has been reached. If so, the system goes to step 426 (stop fill sequence) and displays "Fill Complete" (step 427). Otherwise, the system loops back to step 429, allowing the permissives to be activated to open the next higher-pressure storage vessel in the cascade.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. An apparatus for controlling a rate of delivery of a pressurized fluid from a storage vessel to a receiving tank through a conduit in fluid communication with the storage vessel and the receiving tank, comprising:
    means for establishing a predetermined rate of pressure rise to be maintained during a predetermined time period for filling of the receiving tank with the pressurized fluid; and
    means for maintaining the predetermined rate of pressure rise during filling of the receiving tank with the pressurized fluid during the predetermined time period, said means for maintaining the predetermined rate of pressure rise comprising a pressure control device in communication with the conduit or another conduit through which the pressurized fluid flows at an actual pressure before entering the receiving tank, the pressure control device adapted to increase or decrease the actual pressure of the pressurized fluid.

2. An apparatus as in claim 1, wherein the means for establishing a predetermined rate of pressure rise comprises:
    a computer/controller for generating an electrical signal convertible to a low pressure gas signal; and
    a regulator for amplifying the low pressure gas signal and controlling a fill pressure in the receiving tank.

3. An apparatus as in claim 1, wherein the means for maintaining the predetermined rate of pressure rise further comprises:
    means for calculating periodically a rate of pressure rise over time; and
    means for commanding the pressure control device to decrease the actual pressure when the rate of pressure rise is greater than the established predetermined rate of pressure rise, and to increase the actual pressure when the rate of pressure rise is less than the established predetermined rate of pressure rise.

4. An apparatus as in claim 1, wherein the rate of delivery is controlled as a function of either a percentage of a designated target pressure already achieved or a percentage of a designated target pressure yet to be achieved during a remaining portion of the predetermined time period.

5. An apparatus as in claim 4, wherein the function is linear.

6. An apparatus as in claim 4, wherein the function is geometric.

7. An apparatus as in claim 4, wherein the receiving tank has an instantaneous thermodynamic state and wherein the function varies over time with any changes in the instantaneous thermodynamic state to provide an optimal rate of fill.

8. A method for controlling a rate of delivery of a pressurized fluid from a storage vessel to a receiving tank through a conduit in fluid communication with the storage vessel and the receiving tank, comprising the steps of:

establishing a predetermined rate of pressure rise to be maintained during a predetermined time period for filling of the receiving tank with the pressurized fluid; and maintaining the predetermined rate of pressure rise during filling of the receiving tank with the pressurized fluid during the predetermined time period, wherein the step of maintaining the predetermined rate of pressure rise comprises the sub-steps of:

providing a pressure control device in communication with the conduit or another conduit through which the pressurized fluid flows at an actual pressure before entering the receiving tank, the pressure control device adapted to increase or decrease the actual pressure of the pressurized fluid;

calculating periodically a rate of pressure rise over time; and commanding the pressure control device to decrease the actual pressure when the rate of pressure rise is greater than the established predetermined rate of pressure rise, and to increase the actual pressure when the rate of pressure rise is less than the established predetermined rate of pressure rise.

9. A method as in claim 8, wherein the step of establishing a predetermined rate of pressure rise comprises the sub-steps of:

generating an electric signal convertible to a low pressure gas signal;

amplifying the low pressure gas signal; and controlling a fill pressure in the receiving tank.

10. A method as in claim 8, wherein the rate of delivery is controlled as a function of either a percentage of a designated target pressure already achieved or a percentage of a designated target pressure yet to be achieved during a remaining portion of the predetermined time period.

11. A method as in claim 10, wherein the function is linear.

12. A method as in claim 10, wherein the function is geometric.

13. A method as in claim 10, wherein the receiving tank has an instantaneous thermodynamic state and wherein the function varies over time with any changes in the instantaneous thermodynamic state to provide an optimal rate of fill.

* * * * *